US009225890B2

(12) United States Patent
Nakano et al.

(10) Patent No.: US 9,225,890 B2
(45) Date of Patent: Dec. 29, 2015

(54) IMAGE PROCESSING SYSTEM, PORTABLE INFORMATION DEVICE, REMOTE OPERATION METHOD, AND NON-TRANSITORY COMPUTER-READABLE RECORDING MEDIUM ENCODED WITH COOPERATION PROGRAM

(71) Applicant: Konica Minolta, Inc., Chiyoda-ku (JP)

(72) Inventors: Daisuke Nakano, Kobe (JP); Katsuhiko Akita, Amagasaki (JP); Takeshi Morikawa, Takarazuka (JP); Kazusei Takahashi, Nishinomiya (JP); Yuji Okamoto, Nishinomiya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 40 days.

(21) Appl. No.: 14/021,381

(22) Filed: Sep. 9, 2013

(65) Prior Publication Data

US 2014/0078317 A1 Mar. 20, 2014

(30) Foreign Application Priority Data

Sep. 20, 2012 (JP) ................................. 2012-207652

(51) Int. Cl.
*H04N 5/225* (2006.01)
*H04N 5/232* (2006.01)
*H04N 1/00* (2006.01)

(52) U.S. Cl.
CPC ............. *H04N 5/232* (2013.01); *H04N 1/0044* (2013.01); *H04N 1/00278* (2013.01);
(Continued)

(58) Field of Classification Search
USPC ....................................................... 348/207.2
See application file for complete search history.

(56) References Cited

U.S. PATENT DOCUMENTS

2002/0021903 A1 2/2002 Ito et al.
2002/0036695 A1* 3/2002 Kawade ........................ 348/222
(Continued)

FOREIGN PATENT DOCUMENTS

JP 10-107981 A 4/1998
JP 2000-341616 A 12/2000
(Continued)

OTHER PUBLICATIONS

Japanese Office Action (Notice of Ground of Rejection) dated Sep. 24, 2014, issued by the Japanese Patent Office in corresponding Japanese Patent Application No. 2012207652 and an English translation of the Office Action. (5 pgs).

*Primary Examiner* — Twyler Haskins
*Assistant Examiner* — Dwight C Tejano
(74) *Attorney, Agent, or Firm* — Buchanan Ingersoll & Rooney PC

(57) ABSTRACT

An image processing system includes a portable information device and an image processing device. The portable information device includes a shooting portion, a shooting control portion, and a remote operation portion to remotely operate the image processing device. The image processing device includes an image processing portion and a remote control portion to control the image processing portion. The remote operation portion includes a cooperation notice portion to notify the image processing device of a cooperation state. The shooting control portion includes a transmission portion to transmit image data output by the shooting portion shooting an image of a subject to the image processing device while the remote operation portion is remotely controlling the image processing device. The remote control portion includes an input mode switch portion to set the portable information device as an input source of data to be input to the image processing portion after the notification.

19 Claims, 19 Drawing Sheets

(52) U.S. Cl.
CPC ...... *H04N 1/00411* (2013.01); *H04N 1/00466* (2013.01); *H04N 1/00474* (2013.01); *H04N 1/00482* (2013.01); *H04N 2201/0084* (2013.01); *H04N 2201/0098* (2013.01)

(56) References Cited

U.S. PATENT DOCUMENTS

| | | | |
|---|---|---|---|
| 2003/0033368 A1* | 2/2003 | Tominaga | 709/203 |
| 2003/0043272 A1 | 3/2003 | Nagao et al. | |
| 2003/0227554 A1* | 12/2003 | Kazami et al. | 348/231.3 |
| 2006/0256392 A1* | 11/2006 | Van Hoof et al. | 358/402 |
| 2008/0218788 A1* | 9/2008 | Mimura | 358/1.15 |
| 2008/0278437 A1* | 11/2008 | Barrus et al. | 358/474 |
| 2009/0231637 A1* | 9/2009 | Kemmochi et al. | 358/474 |
| 2011/0063456 A1* | 3/2011 | Ohnishi et al. | 348/207.2 |
| 2012/0069371 A1* | 3/2012 | Fujii | 358/1.13 |

FOREIGN PATENT DOCUMENTS

| | | |
|---|---|---|
| JP | 2002-064740 A | 2/2002 |
| JP | 2002-094910 A | 3/2002 |
| JP | 2003-069988 A | 3/2003 |
| JP | 2004-007031 A | 1/2004 |

\* cited by examiner

F I G. 2
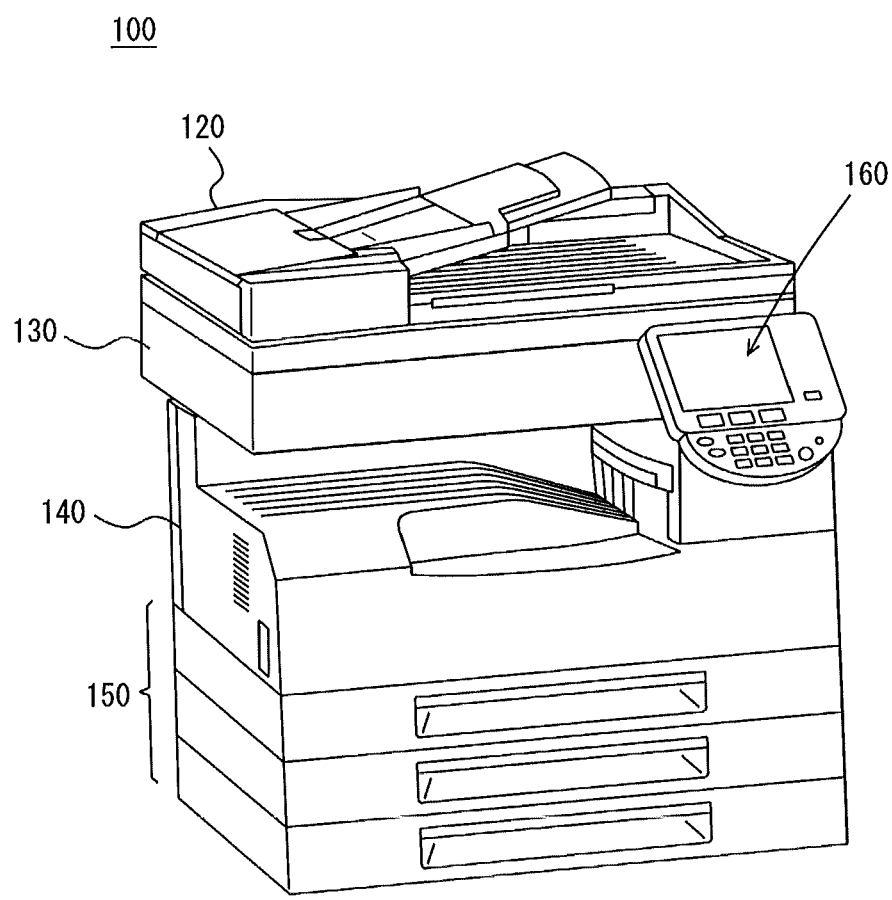

F I G. 1 2
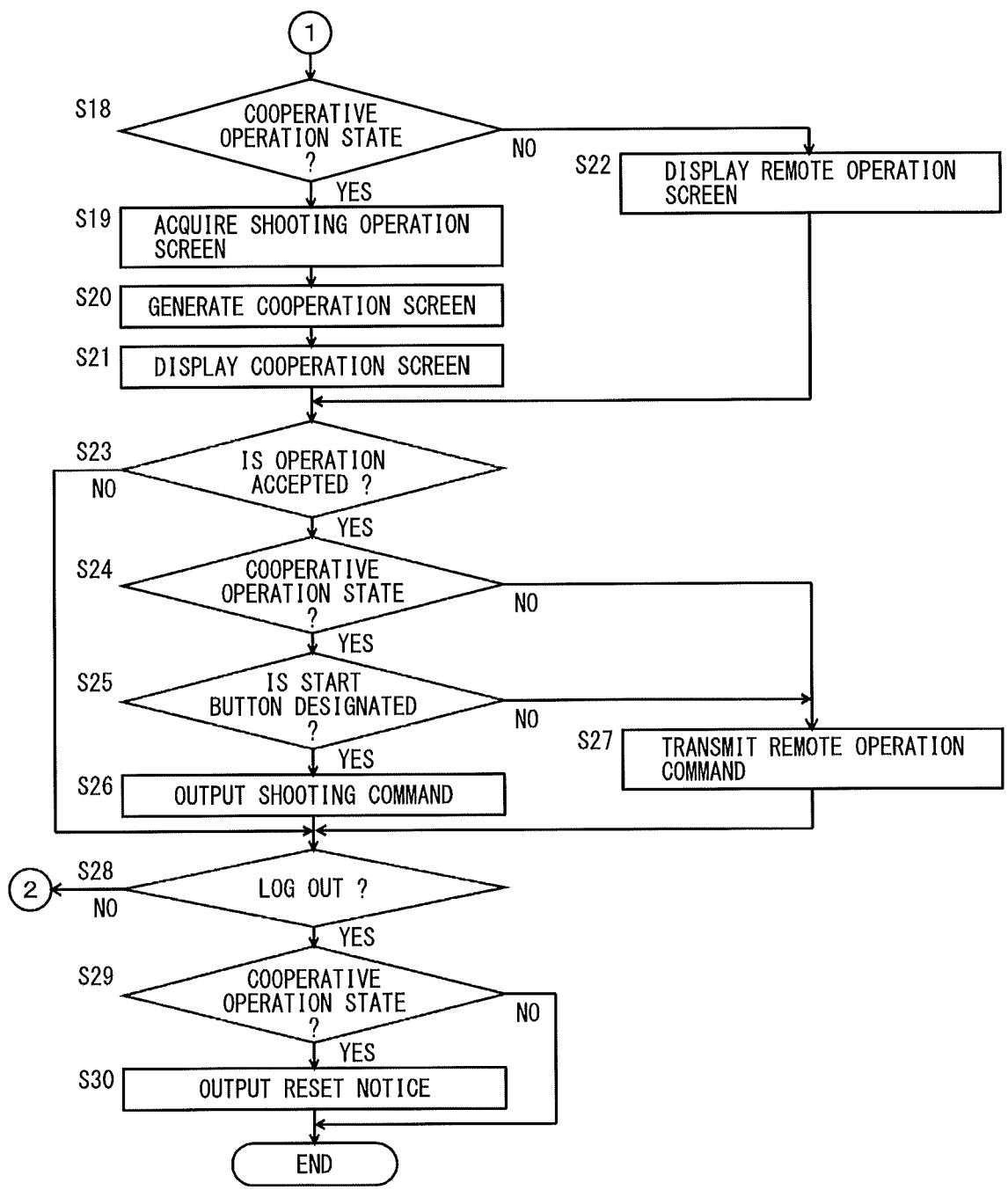

IMAGE PROCESSING SYSTEM, PORTABLE INFORMATION DEVICE, REMOTE OPERATION METHOD, AND NON-TRANSITORY COMPUTER-READABLE RECORDING MEDIUM ENCODED WITH COOPERATION PROGRAM

This application is based on Japanese Patent Application No. 2012-207652 filed with Japan Patent Office on Sep. 20, 2012, the entire content of which is hereby incorporated by reference.

BACKGROUND OF THE INVENTION

1. Field of the Invention

The present invention relates to an image processing system, a portable information device, a remote operation method, and a non-transitory computer-readable recording medium encoded with a cooperation program. More specifically, the present invention relates to an image processing system including an image processing device remotely operated by a portable information device, a remote operation method performed in the portable information device, and a non-transitory computer-readable recording medium encoded with a cooperation program.

2. Description of the Related Art

Conventionally, when an image captured by a camera is printed with a printer, it is necessary to store image data obtained by capturing an image of a subject with a camera, then transmit the image data stored in the camera to the printer, and print the image data with the printer. For example, Japanese Patent Laid-Open No. 10-107981 discloses a technique for remotely operating a camera connected to a printer from the printer.

However, the operation of capturing an image of a subject with a camera and the operation of printing the captured image have to be separately performed. This is a complicated task.

SUMMARY OF THE INVENTION

In accordance with an aspect of the present invention, an image processing system includes a portable information device and an image processing device. The portable information device includes a shooting portion to shoot an image of a subject, a shooting control portion to control the shooting portion, and a remote operation portion to remotely operate the image processing device. The image processing device includes an image processing portion to process image data and a remote control portion to control the image processing portion in accordance with a remote operation command received from the portable information device. The remote operation portion includes a cooperation notice portion to give a notice to the image processing device to indicate a cooperation state of cooperating with the shooting control portion. The shooting control portion includes a transmission portion to transmit image data output by the shooting portion shooting an image of a subject to the image processing device while the remote operation portion is remotely controlling the image processing device. The remote control portion includes an input mode switch portion to switch an input mode to an external input mode in which the portable information device is set as an input source of data to be input to the image processing portion, after the notice indicating the cooperation state is given.

In accordance with another aspect of the present invention, a portable information device capable of remotely operating an image processing device includes a shooting portion to shoot an image of a subject, a shooting control portion to control the shooting portion, and a remote operation portion to remotely operate the image processing device. The remote operation portion includes a cooperation notice portion to give a notice to the image processing device to indicate a cooperate state of cooperating with the shooting control portion in order to switch an input source of data to be processed by the image processing device to the portable information device. The shooting control portion includes a transmission portion to transmit image data output by the shooting portion shooting an image of a subject to the image processing device in order to allow the image processing device to process the image data while the remote operation portion is remotely controlling the image processing device.

According to this aspect, a notice indicating a cooperation state is given to the image processing device, and image data obtained by shooting an image of a subject is transmitted to the image processing device in order to allow the image processing device to process the image data while the image processing device is being remotely controlled. Accordingly, by giving an instruction to shoot an image to the portable information device, the user can allow the image processing device to process image data obtained by shooting an image of a subject with the portable information device. As a result, a portable information device is provided in which remote operation on the image processing device is easy.

In accordance with a further aspect of the present invention, a remote operation method is performed in an image processing system including a portable information device and an image processing device. The portable information device includes a shooting portion to shoot an image of a subject. The image processing device includes an image processing portion to process image data. The method includes: allowing the portable information device to perform a shooting control step of controlling the shooting portion and a remote operation step of remotely operating the image processing device; and allowing the image processing device to perform a remote control step of controlling the image processing portion in accordance with a remote operation command received from the portable information device. The remote operation step includes a step of detecting a shooting ready state in which shooting by the shooting portion is ready in the shooting control step, and a cooperation notice step of giving a notice to the image processing device to indicate a cooperation state while the shooting ready state is being detected. The shooting control step includes a step of detecting a remote operation state in which the image processing device is being remotely operated in the remote operation step, and a transmission step of transmitting image data output by the shooting portion shooting an image of a subject to the image processing device while the remote operation state is being detected. The remote control step includes an input mode switch step of switching an input mode to an external input mode in which the portable information device is set as an input source of data to be input to the image processing portion, after the notice indicating the cooperation state is given.

With the remote operation method according to this aspect, the operation of allowing the portable information device and the image processing device to cooperate with each other for processing becomes easy.

In accordance with a further aspect of the present invention, a remote operation method is performed in a portable information device capable of remotely operating an image processing device. The portable information device includes a shooting portion to shoot an image of a subject. The method includes; a shooting control step of controlling the shooting portion; and a remote operation step of remotely operating the image processing device. The remote operation step includes a step of detecting a shooting ready state in which shooting by the shooting portion is ready in the shooting control step, and a cooperation notice step of giving a notice to the image processing device to indicate a cooperation state in order to switch an input source of data to be processed by the image processing device to the portable information device while the shooting ready state is being detected. The shooting control step includes a step of detecting a remote operation state in which the image processing device is being remotely operated in the remote operation step, and a transmission step of transmitting image data output by the shooting portion shooting an image of a subject to the image processing device in order to allow the image processing device to process the image data while the remote operation state is being detected.

In accordance with yet another aspect of the present invention, a non-transitory computer-readable recording medium is encoded with a cooperation program executed in a computer that controls a portable information device capable of remotely operating an image processing device. The portable information device includes a shooting portion to shoot an image of a subject. The program causes the computer to perform: a shooting control step of controlling the shooting portion; and a remote operation step of remotely operating the image processing device. The remote operation step includes a step of detecting a shooting ready state in which shooting by the shooting portion is ready in the shooting control step, and a cooperation notice step of giving a notice to the image processing device to indicate a cooperation state in order to switch an input source of data to be processed by the image processing device to the portable information device while the shooting ready state is being detected. The shooting control step includes a step of detecting a remote operation state in which the image processing device is being remotely operated in the remote operation step, and a transmission step of transmitting image data output by the shooting portion shooting an image of a subject to the image processing device in order to allow the image processing device to process the image data while the remote operation state is being detected.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is an external perspective view of an MFP.

FIG. 12 is a second flowchart showing an exemplary flow of the remote operation process.

DESCRIPTION OF THE PREFERRED EMBODIMENTS

Figure 1:
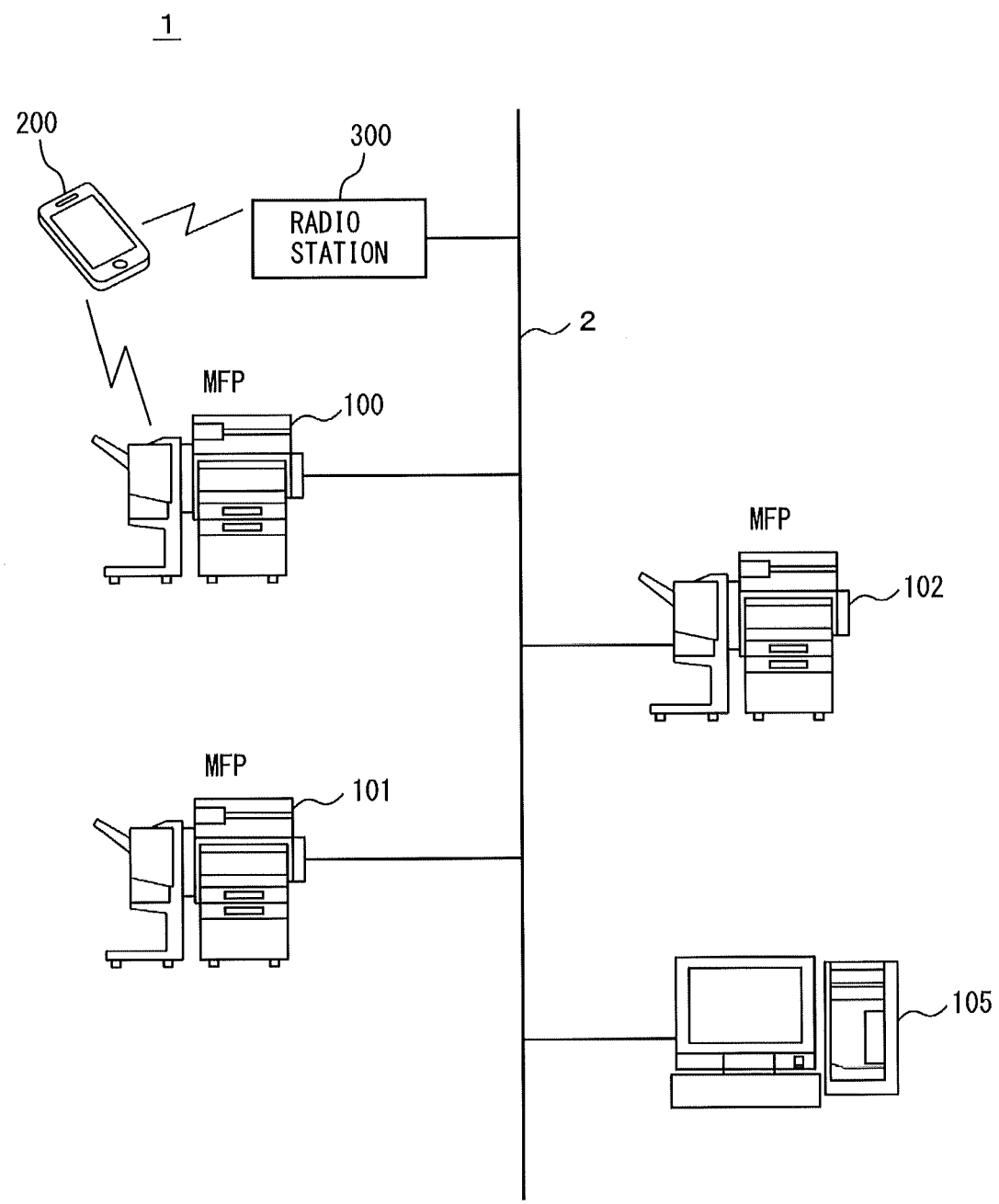
FIG. 1 is a diagram showing an overview of an image processing system in an embodiment of the present invention.

Embodiments of the present invention will be described below in conjunction with the figures. In the following description, the same parts are denoted with the same reference numerals. Their names and functions are also the same. A detailed description thereof is therefore not repeated.

FIG. 1 is a diagram showing an overview of an image processing system in an embodiment of the present invention. Referring to FIG. 1, an image processing system 1 includes MFPs (Multi-Functional Peripherals) 100, 101, 102, a personal computer (hereinafter referred to as "PC") 105, a portable information device 200, and a radio station 300, each being connected to a network 2.

PC 105 is a general computer. A printer driver program for controlling MFPs 100, 101, 102 is installed in PC 105. When the types of MFPs 100, 101, 102 are different, three kinds of printer driver programs are installed in PC 105 for controlling MFPs 100, 101, 102.

MFP 100, 101, 102 each have a document scanning function for scanning a document, an image forming function for forming an image on a recording medium such as paper based on image data, and a facsimile transmission/reception function for transmitting/receiving facsimile data. In the present embodiment, MFPs 100, 101, 102 will be described, by way of example. However, MFPs 100, 101, 102 may be replaced by any other devices that have the function of processing image data, such as printers, facsimiles, and computers. MFPs 100, 101, 102 have the same functions and therefore MFP 100 is taken as an example in the following description, unless otherwise specified.

Portable information device 200 is here a general mobile phone. Portable information device 200 wirelessly communicates with a mobile phone base station to connect to a mobile phone network for making calls. Portable information device 200 has a wireless LAN function. Here, portable information device 200 is a mobile phone, by way of example. However, portable information device 200 is not limited to a mobile phone but may be any other device that has the function of shooting an image of a subject, for example, such as a digital camera, a digital still camera, a PDA (Personal Digital Assistant), or a portable computer.

Network 2 is a Local Area Network (LAN), either wired or wireless. Network 2 is not limited to a LAN but may be a network using a Public Switched Telephone Network (PSTN). Network 2 is further connected to a Wide Area Network (WAN) such as the Internet.

Radio station 300 is a relay apparatus of network 2 that communicates with portable information device 200 having a wireless LAN communication function to connect portable information device 200 to network 2. MFPs 100, 101, 102 are each able to transmit/receive data to/from PC 105 through network 2. MFPs 100, 101, 102 each can transmit/receive data to/from portable information device 200 through network 2 and radio station 300.

Figure 3:
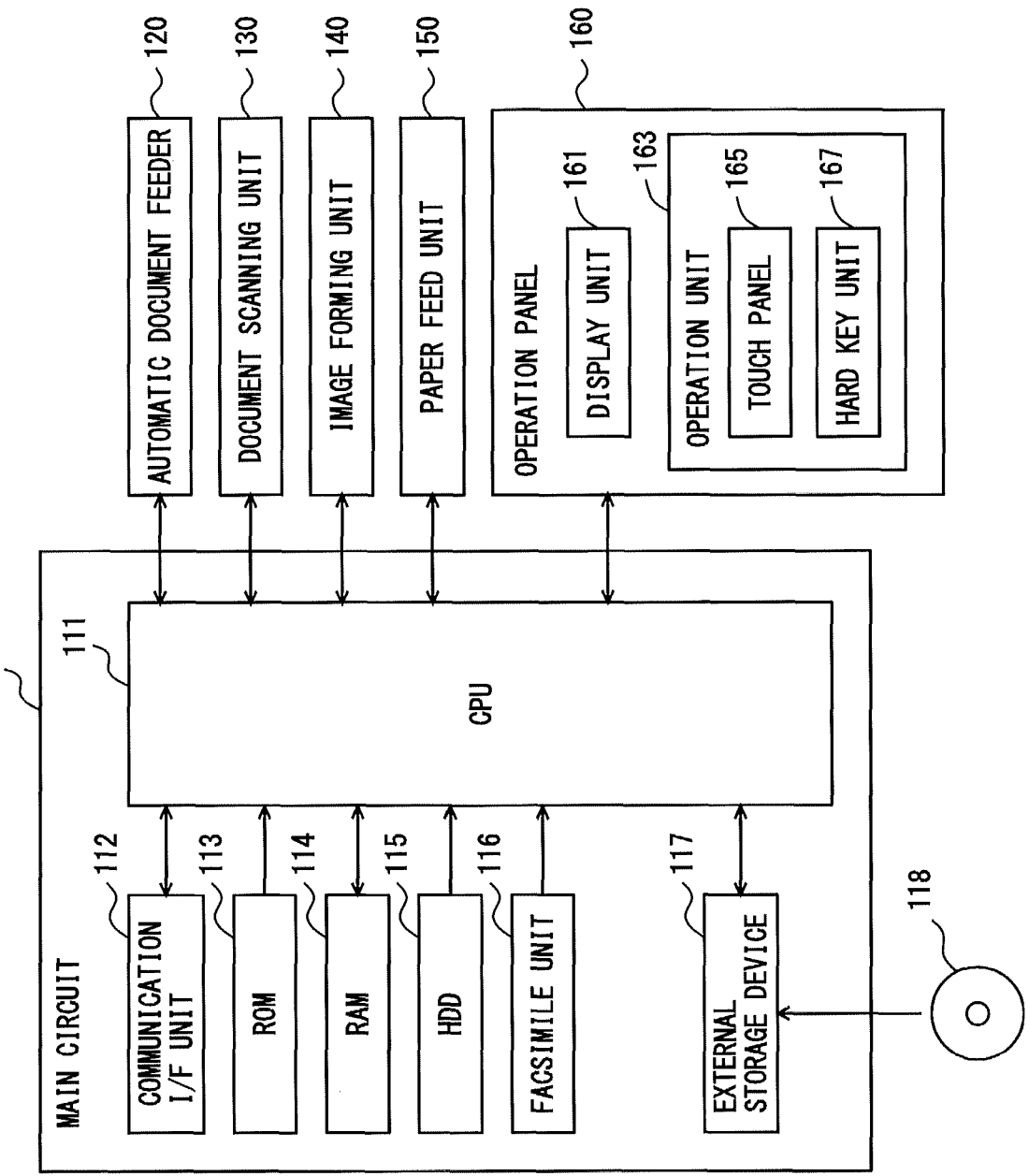
FIG. 3 is a block diagram showing an overall hardware configuration of the MFP.

FIG. 2 is an external perspective view of an MFP. FIG. 3 is a block diagram showing an overall hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on a sheet of paper based on image data output by document scanning unit 130 scanning a document, a paper feed unit 150 for supplying paper to image forming unit 140, and an operation panel 160 serving as a user interface.

Main circuit 110 includes a CPU 111, a communication interface (I/F) unit 112, a ROM 113, a RAM 114, an HDD (Hard Disk Drive) 115 serving as a mass storage device, a facsimile unit 116, and an external storage device 117 to which a CD-ROM 118 is attached. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary to execute the program. RAM 114 is used as a working area for CPU 111 to execute a program. RAM 114 temporarily stores scan data (image data) successively sent from document scanning unit 130.

Operation panel 160 is provided on the upper surface of MFP 100 and includes a display unit 161 and an operation unit 163. Display unit 161 is a display such as an LCD (Liquid Crystal Display) or an organic ELD (Electroluminescence Display) for displaying instruction menus to users, information about the acquired image data, and the like. Operation unit 163 includes a touch panel 165 provided on display unit 161 and a hard key unit 167 including a plurality of keys. When a user designates a display surface of display unit 161, operation unit 163 accepts operation corresponding to the position designated by the user in the image appearing on display unit 161. User's operation on a key designated by the user among a plurality of keys included in hard key unit 167 is also accepted.

Communication I/F unit 112 is an interface for connecting MFP 100 to network 2. CPU 111 communicates with MFP 101, 102, PC 105, or portable information device 200 through communication I/F unit 112 to transmit/receive data. Communication I/F unit 112 can also communicate with a computer connected to the Internet via network 2.

Facsimile unit 116 is connected to a PSTN (Public Switched Telephone Network) to transmit facsimile data to the PSTN or receive facsimile data from the PSTN. Facsimile unit 116 stores the received facsimile data into HDD 115 or outputs the received facsimile data to image forming unit 140. Image forming unit 140 prints the facsimile data received by facsimile unit 116 on a sheet of paper. Facsimile unit 116 also converts data stored in HDD 115 into facsimile data and transmits the facsimile data to a facsimile machine connected to the PSTN.

CD-ROM 118 is attached to external storage device 117. CPU 111 can access CD-ROM 118 through external storage device 117. CPU 111 loads a program stored in CD-ROM 118 attached to external storage device 117 into RAM 114 for execution. A medium encoded with a program executed by CPU 111 is not limited to CD-ROM 118 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

The program executed by CPU 111 is not limited to a program stored in CD-ROM 118, and a program stored in HDD 115 may be loaded into RAM 114 for execution. In this case, another computer connected to network 2 may overwrite the program stored in HDD 115 of MFP 100 or additionally write a new program. MFP 100 may download a program from another computer connected to network 2 and store the program into HDD 115. The program referred to here includes not only a program directly executable by CPU 111 but also a source program, a compressed program, an encrypted program, and the like.

In image processing system 1 in the present embodiment, data is transmitted/received between MFPs 100, 101, 102 and portable information device 200. Any protocol can be used to transmit/receive data as long as a transmission source can be specified at the receiver device. Examples of the protocol for transmitting/receiving data include HTTP (Hyper Text Transfer Protocol), FTP (File Transfer Protocol), SMTP (Simple Mail Transfer Protocol), and POP (Post Office Protocol).

Figure 4:
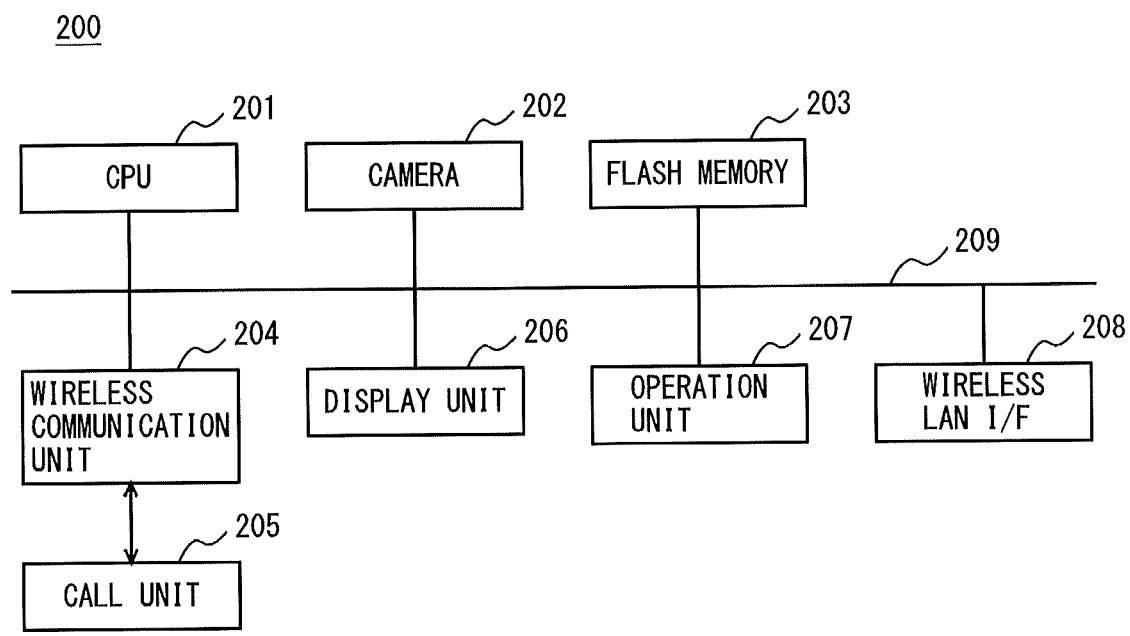
FIG. 4 is a functional block diagram showing an overall hardware configuration of a portable information device.

FIG. 4 is a functional block diagram showing an overall hardware configuration of the portable information device. Referring to FIG. 4, portable information device 200 includes a CPU 201 for controlling the entire portable information device 200, a camera 202, a flash memory 203 for storing data in a nonvolatile manner, a radio communication unit 204 connected to a call unit 205, a display unit 206 for displaying information, an operation unit 207 for accepting user's input of operation, and a wireless LAN I/F 208.

Wireless communication unit 204 wirelessly communicates with a mobile phone base station connected to a telephone communication network. Wireless communication unit 204 connects portable information device 200 to the telephone communication network to establish calls using call unit 205. Wireless communication unit 204 decodes a voice signal obtained by demodulating a radio signal received from the mobile phone base station and outputs the decoded signal to call unit 205. Wireless communication unit 204 encodes voice input from call unit 205 and transmits the encoded voice to the mobile phone base station. Call unit 205 includes a microphone and a speaker to output voice input from wireless communication unit 204 from the speaker and output voice input from the microphone to wireless communication unit 204. Wireless communication unit 204 is controlled by CPU 201 and connects portable information device 200 to an email server to transmit/receive emails.

Camera 202 includes a lens and an optoelectronic transducer. Light collected by the lens is imaged at the optoelectronic transducer, which transduces the received light into image data for output to CPU 201. The optoelectronic transducer is, for example, a CMOS (Complementary Metal Oxide Semiconductor) sensor or a CCD (Charge Coupled Device) sensor.

Display unit 206 is a display such as a Liquid Crystal Display (LCD) or an organic ELD and displays instruction menus to the user, information about the acquired image data, and the like. Operation unit 207 includes a touch panel provided on display unit 206 and hard keys including a plurality of keys. When the user designates the display surface of display unit 206, operation unit 207 accepts operation corresponding to the position designated by the user in the image appearing on display unit 206. When the user designates a hard key, user's operation corresponding to the designated hard key is accepted.

Wireless LAN I/F 208 is an interface that communicates with radio station 300 for connecting portable information device 200 to network 2. The respective IP addresses of MFPs 100, 101, 102 are registered in advance in portable information device 200 so that portable information device 200 can communicate with MFPs 100, 101, 102 and transmit/receive data. Although portable information device 200 communicates with MFPs 100, 101, 102 using wireless LAN I/F 208 in the present embodiment, by way of example, any other communication method can be used for communication. Specifically, in a case where portable information device 200 and MFPs 100, 101, 102 are each equipped with a short distance radio device such as Bluetooth®, portable information device 200 may communicate one-to-one with any one of MFPs 100, 101, 102. Portable information device 200 may be connected by wire such as a USB (Universal Serial Bus) cable to any one of MFPs 100, 101, 102 so that portable information device 200 communicates one-to-one with any one of MFPs 100, 101, 102.

Flash memory 203 stores a program executed by CPU 201 or data necessary to execute the program. CPU 201 loads the program stored in flash memory 203 into the RAM of CPU 201 for execution. The program executed by CPU 201 may be a program stored in flash memory 203, or another computer connected to network 2 may overwrite the program stored in flash memory 203 or additionally write a new program. Portable information device 200 may download a program from another computer connected to network 2. The program referred to here includes not only a program directly executable by CPU 201 but also a source program, a compressed program, an encrypted program, and the like.

A medium encoded with a program executed by CPU 201 is not limited to flash memory 203 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EEPROM).

Figure 5:
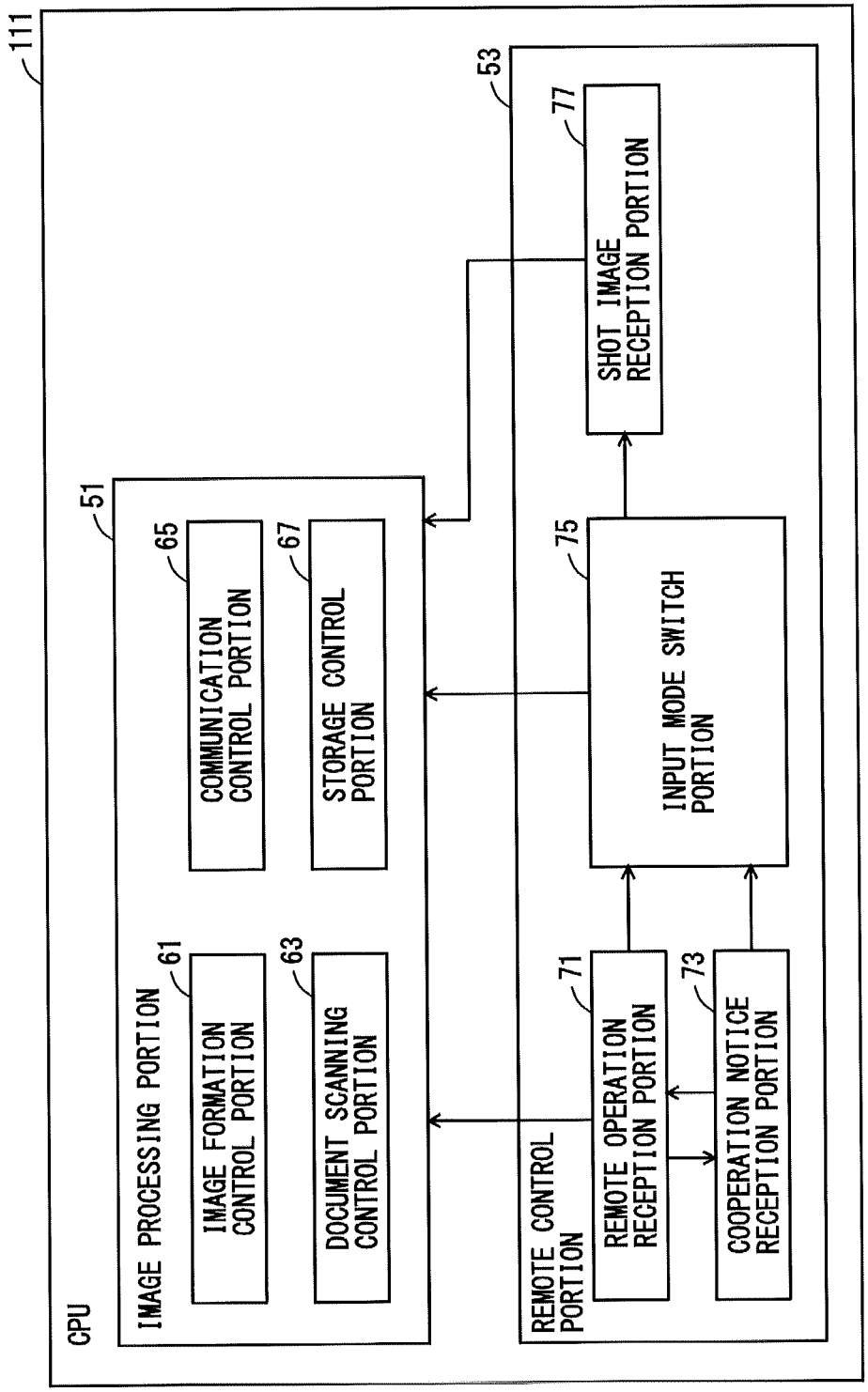
FIG. 5 is a block diagram showing an overview of functions of the CPU of the MFP in the present embodiment.

FIG. 5 is a block diagram showing an overview of functions of the CPU of the MFP in the present embodiment. The functions shown in FIG. 5 are formed in CPU 111 by CPU 111 of MFP 100 executing a remote control program stored in ROM 113, HDD 115, or CD-ROM 118. Referring to FIG. 5, CPU 111 includes an image processing portion 51 for performing image processing and a remote control portion 53 for performing a process in accordance with a remote operation command received from the portable information device.

Image processing portion 51 performs a process in accordance with setting values. Image processing portion 51 includes an image formation control portion 61 for controlling image forming unit 140 and paper feed unit 150, a document scan control portion 63 for controlling automatic document feeder 120 and document scanning unit 130, a communication control portion 65 for controlling communication I/F unit 112 and facsimile unit 116, and storage control portion 67 for controlling HDD 115 and external storage device 117.

Image formation control portion 61 allows paper feed unit 150 to convey paper and allows image forming unit 140 to form an image of data set as a process target on paper conveyed by paper feed unit 150. Data as a target to be processed by image formation control portion 61 is set by document scan control portion 63, communication control portion 65, and storage control portion 67. The setting values include the size and direction of paper conveyed by paper feed unit 150, values that define the conditions for image forming unit 140 to form an image, for example, color/monochrome, an enlargement ratio or a reduction ratio, the number of copies of image formation, and the position in paper where an image is formed.

Document scan control portion 63 allows automatic document feeder 120 to convey a document and allows document scanning unit 130 to scan an image of the document conveyed by automatic document feeder 120. Document scan control portion 63 sets image data output by document scanning unit 130 scanning a document, as a target to be processed. The setting values include, for example, resolution, color/monochrome, and the format of image data.

Communication control portion 65 controls communication I/F unit 112 to transmit/receive data to/from a device connected to network 2, for example, other MFPs 101, 102, PC 105, or radio station 300. Communication control portion 65 also controls facsimile unit 116 to allow facsimile unit 116 to transmit/receive facsimile data. Data or facsimile data as a target to be transmitted by communication control portion 65 is set as a target to be processed by document scan control portion 63 or storage control portion 67. Communication control portion 65 sets the received data or facsimile data as a target to be processed. The setting values include communication protocol, communication speed, and information of a recipient of data or facsimile data.

Storage control portion 67 reads out data stored in HDD 115 or data stored in a CD-ROM attached to external storage device 117 and sets the read data as a target to be processed. Storage control portion 67 stores the data set as a target to be processed into HDD 115. When a data-writable recording medium such as a DVD is attached to external storage device 117, storage control portion 67 stores the data set as a target to be processed into the DVD. The setting values include the format of data, information indicating the location to store data, and data identification information such as a file name for identifying data to be read out.

Remote control portion 53 includes a remote operation reception portion 71, a cooperation notice reception portion 73, an input mode switch portion 75, and a shot image reception portion 77. Remote operation reception portion 71 transmits a login screen to portable information device 200 when communication I/F unit 112 establishes connection with portable information device 200 and receives a login request from portable information device 200. The login screen includes an area for inputting user identification information for identifying a user and an area for inputting authentication information. Remote operation reception portion 71 receives user identification information and authentication information from portable information device 200 receiving the login screen and authenticates the user who operates portable information device 200. MFP 100 stores user data including user identification information for identifying a user and authentication information in HDD 115. Remote operation reception portion 71 compares the user identification information and authentication information received from portable information device 200 with the user data stored beforehand in HDD 115. If they agree, remote operation reception portion 71 determines that authentication is successful, and permits login. If they do not agree, remote operation reception portion 71 determines that authentication is failed, and does not permit login. If login is permitted, remote operation reception portion 71 returns a permission signal. If login is not permitted, remote operation reception portion 71 returns a non-permission signal.

Remote operation reception portion 71 acquires device identification information of portable information device 200 when connection with portable information device 200 is established. The identification information of portable information device 200 is, for example, location information on network 2 that is allocated to portable information device 200. The location information on network 2 is, for example, an IP (Internet Protocol) address or a MAC (Media Access Control) address. If authentication is successful, remote operation reception portion 71 outputs a set of the user identification information for identifying the user who operates the authenticated portable information device 200 and the device identification information of portable information device 200 to cooperation notice reception portion 73 and input mode switch portion 75.

Remote operation reception portion 71 outputs a logout notice to cooperation notice reception portion 73 and input mode switch portion 75 if connection with portable information device 200 is cut off or if a logout command is received from portable information device 200 after authentication of the user who operates portable information device 200 is successful.

Although a password is used as authentication information in the present embodiment, biometric information such as finger prints, vein patterns, and irises of users may be used as authentication information. In this case, portable information device 200 includes a reader for reading biometric information.

Remote operation reception portion 71 receives a remote operation command from portable information device 200 until a logout command is received after authentication of the user who operates portable information device 200 is successful. Specifically, when communication I/F unit 112 receives a remote operation command, remote operation reception portion 71 acquires the device identification information of the device that has transmitted the remote operation command and compares the acquired device identification information with the device identification information of the device operated by the user who has been successfully authenticated, here, portable information device 200. If they are the same, remote operation reception portion 71 acquires the remote operation command received by communication I/F unit 112. If they are different, remote operation reception portion 71 discards the remote operation command received by communication I/F unit 112. Accordingly, the remote operation command can be received only when the authenticated user operates portable information device 200.

When a remote operation command is received, remote operation reception portion 71 allows image processing portion 51 to execute a process in accordance with the remote operation command. The remote operation command includes a remote operation command to set a setting value for image processing portion 51 to execute a process and a remote operation command to give an instruction to execute a process.

When a remote operation command to set a setting value is received, remote operation reception portion 71 sets the setting value included in the remote operation command. Specifically, the setting value is stored into RAM 114. When a remote operation command to give an instruction to execute a process, remote operation reception portion 71 allows image processing portion 51 to execute a process.

Cooperation notice reception portion 73 receives a cooperation notice or a cooperation reset notice transmitted from portable information device 200 specified by the device identification information until a logout notice is input after a set of user identification information and device identification information of portable information device 200 is input from remote operation reception portion 71. When communication I/F unit 112 receives a cooperation notice or a cooperation reset notice, cooperation notice reception portion 73 acquires the device identification information of the device that has transmitted the cooperation notice or the cooperation reset notice and compares the acquired device identification information with the device identification information input from remote operation reception portion 71. If the device identification information of the device that has transmitted the cooperation notice or the cooperation reset notice is the same as the device identification information input from remote operation reception portion 71, cooperation notice reception portion 73 acquires the cooperation notice or the cooperation reset notice received by communication I/F unit 112. If they are different, cooperation notice reception portion 73 discards the cooperation notice or the cooperation reset notice received by communication I/F unit 112. Accordingly, the cooperation notice or the cooperation reset notice can be received only when the user authenticated by remote operation reception portion 71 operates portable information device 200.

The cooperation notice or the cooperation reset notice is a signal transmitted by portable information device 200 described later to MFP 100. Portable information device 200 is operated by the user who is registered beforehand in MFP 100, so that only the cooperation notice or the cooperation reset notice that is transmitted from portable information device 200 can be received. If a cooperation notice is received, cooperation notice reception portion 73 outputs a set of a cooperation signal indicating that the cooperation notice is received and the device identification information of portable information device 200 to input mode switch portion 75. If a cooperation reset notice is received, cooperation notice reception portion 73 outputs a set of a cooperation reset signal indicating that the cooperation reset notice is received and the device identification information of portable information device 200 to input mode switch portion 75.

Input mode switch portion 75 receives a set of the cooperation signal and the device identification information from cooperation notice reception portion 73 and then switches the input mode of image processing portion 51 from an internal input mode to an external input mode. After switching the input mode of image processing portion 51 to the external input mode, if a set of a cooperation reset signal and device identification information is input from cooperation notice reception portion 73, or if a logout notice is input from remote operation reception portion 71, input mode switch portion 75 switches the input mode of image processing portion 51 from the external input mode to the internal input mode. The input mode is a mode for defining the input source of data set as a process target by image processing portion 51. The external input mode is an input mode in which the input source of data as a target to be processed by image processing portion 51 is communication I/F unit 112. The internal input mode is an input mode in which the input source of data as a target to be processed by image processing portion 51 is image scanning unit 130, facsimile unit 116, HDD 115, or external storage device 117 of MFP 100.

When the input mode of image processing portion 51 is switched from the internal input mode to the external input mode, input mode switch portion 75 outputs a reception start command to shot image reception portion 77. When the input mode of image processing portion 51 is switched from the external input mode to the internal input mode, input mode switch portion 75 outputs a reception end signal to shot image reception portion 77. The reception start command includes the device identification information input from cooperation notice reception portion 73.

When communication I/F unit 112 receives image data from portable information device 200 for a period from the input of the reception start command from input mode switch portion 75 to the input of the reception end command, shot image reception portion 77 outputs the received image data to image processing portion 51. When communication I/F unit 112 receives image data, shot image reception portion 77 compares the device identification information of the device that has transmitted the received image data with the device identification information included in the reception start command. If they are the same, shot image reception portion 77 outputs the image data received by communication I/F unit 112 to image processing portion 51. If they are different, shot image reception portion 77 discards the image data received by communication I/F unit 112. Accordingly, the image data transmitted by portable information device 200 can be received only when the user authenticated by remote operation reception portion 71 operates portable information device 200.

Figure 6:
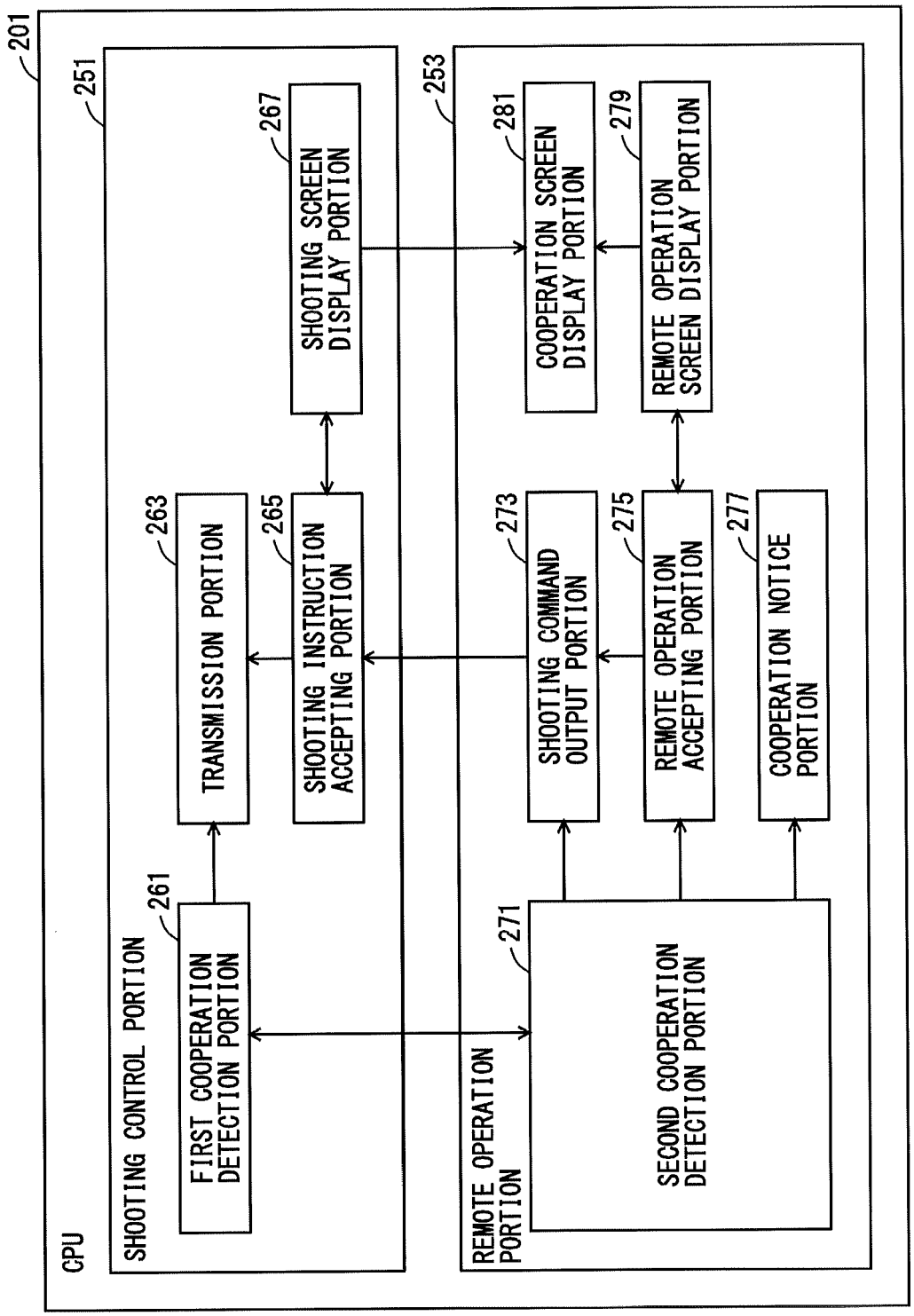
FIG. 6 is a block diagram showing an overview of functions of the CPU of the portable information device in the present embodiment.

FIG. 6 is a block diagram showing an overview of functions of the CPU of the portable information device in the present embodiment. The functions shown in FIG. 6 are formed in CPU 201 by CPU 201 of portable information device 200 executing a shooting control program and a remote operation program stored in flash memory 203. The shooting control program and the remote operation program are collectively referred to as a cooperation program. Referring to FIG. 6, CPU 201 of portable information device 200 includes a shooting control portion 251 for controlling camera 202 and a remote operation portion 253 for remotely operating any one of MFPs 100, 101, 102. Shooting control portion 251 is a function formed in CPU 201 by CPU 201 executing the shooting control program. Remote operation portion 253 is a function formed in CPU 201 by CPU 201 executing the remote operation program. CPU 201 executes the shooting control program to activate shooting control portion 251. CPU 201 executes the remote operation program to activate remote operation portion 253.

Shooting control portion 251 includes a first cooperation detection portion 261, a transmission portion 263 for transmitting image data, a shooting instruction accepting portion 265 for accepting a shooting instruction, and a shooting screen display portion 267 for displaying a shooting operation screen.

Remote operation portion 253 includes a second cooperation detection portion 271, a shooting command output portion 273, a remote operation accepting portion 275 for accepting remote operation, a cooperation notice portion 277, a remote operation screen display portion 279 for displaying a remote operation screen, and a cooperation screen display portion 281.

Second cooperation detection portion 271 selects a device selected by the user among from MFPs 100, 101, 102 as a device serving as a target for remote operation. MFPs 100, 101, 102 are registered beforehand in portable information device 200 as devices that can be a target for remote operation. Second cooperation detection portion 271 displays a select screen on display unit 206 to display a selection of the respective device identification information of MFPs 100, 101, 102. When the user inputs operation of selecting device identification information displayed on the select screen to operation unit 207, second cooperation detection portion 271 selects the device having the device identification information selected from MFPs 100, 101, 102 as a device serving as a target for remote operation.

Second cooperation detection portion 271 logs in to the device selected as a device serving as a target for remote operation. Here, MFP 100 is selected by the user as a device serving as a target for remote operation, by way of example. Specifically, a login request is transmitted to MFP 100 through wireless LAN I/F 208. MFP 100 receiving the login request returns a login screen. Second cooperation detection portion 271 then displays the login screen received from MFP 100 on display unit 206 and accepts user identification information and authentication information input by the user through operation unit 207 in accordance with the login screen. Second cooperation detection portion 271 transmits a set of the accepted user identification information and authentication information to MFP 100 through wireless LAN I/F 208. If the login is permitted, MFP 100 returns a permission signal. If the login is not permitted, MFP 100 returns a non-permission signal. When wireless LAN I/F 208 receives a permission signal from MFP 100, second cooperation detection portion 271 outputs the device identification information of MFP 100 to which login is permitted to shooting command output portion 273, remote operation accepting portion 275, and cooperation notice portion 277. MFP 100 to which login is permitted is the device set as a target for remote operation by portable information device 200.

In addition, second cooperation detection portion 271 sets an operation state of remote operation portion 253. The operation state includes an idling state and a remote operation state. The remote operation state includes a single control state and a cooperative control state. The idling state is a state of not logging in to any of MFPs 100, 101, 102. The remote operation state is a state of logging in to any one of MFPs 100, 101, 102. The single control state is a state in which login to any one of MFPs 100, 101, 102 is successful and shooting control portion 251 is not activated. The cooperative control state is a state in which second cooperation detection portion 271 is logging in to any one of MFPs 100, 101, 102 and shooting control portion 251 is activated.

Specifically, second cooperation detection portion 271 sets the operation state of remote operation portion 253 to the idling state at the point of time when remote operation portion 253 is activated. When a permission signal is received from any one of MFPs 100, 101, 102, second cooperation detection portion 271 switches the operation state from the idling state to the single operation state if shooting control portion 251 is not activated at the point of time when the permission signal is received. Second cooperation detection portion 271 switches the operation state from the idling state to the cooperative operation state if shooting control portion 251 is activated at the point of time when the permission signal is received. If shooting control portion 251 is activated at the point of time when a permission signal is received from any one of MFPs 100, 101, 102, second cooperation detection portion 271 outputs a first activation notice to shooting control portion 251 to indicate that remote operation portion 253 is in remote operation. The first activation notice includes device identification information of the device that has transmitted the permission signal among MFPs 100, 101, 102, in other words, the device serving as a target for remote operation.

When the activation of shooting control portion 251 is detected when the operation state is switched in the single operation state, second cooperation detection portion 271 switches the operation state from the single operation state to the cooperative operation state. As will be described later, first cooperation detection portion 261 of shooting control portion 251 outputs a second activation notice to remote operation portion 253 if remote operation portion 253 is activated at the point of time when shooting control portion 251 is activated. If the second activation notice is input from first cooperation detection portion 261 of shooting control portion 251, second cooperation detection portion 271 detects that shooting control portion 251 is activated. If it is detected that shooting control portion 251 is activated and the operation state is switched from the single operation state to the cooperative operation state, second cooperation detection portion 271 outputs cooperation destination device information to first cooperation detection portion 261 of shooting control portion 251. The cooperation destination device information includes the device identification information of the device that has transmitted the permission signal, among MFPs 100, 101, 102, in other words, the device serving as a target for remote operation.

When operation to terminate the remote operation is input from the user in the cooperative operation state, second cooperation detection portion 271 switches the operation state to the idling state and outputs a reset notice to second cooperation detection portion 261 of shooting control portion 251. When remote operation portion 253 terminates, in other words, when CPU 201 terminates execution of the remote operation program, second cooperation detection portion 271 outputs a reset notice to second cooperation detection portion 261 of shooting control portion 251.

Conversely, when shooting control portion 251 terminates, in other words, when CPU 201 terminates execution of the shooting control program, first cooperation detection portion 261 of shooting control portion 251 outputs a reset notice to second cooperation detection portion 271. Therefore, when the operation state is set in the cooperative operation state, if a reset notice is input from first cooperation detection portion 261, second cooperation detection portion 271 switches the operation state from the cooperative operation state to the single operation state.

Cooperation notice portion 277 receives device identification information from second cooperation detection portion 271. Cooperation notice portion 277 transmits a cooperation notice to the device specified by the device identification information through wireless LAN I/F 208 when the operation state is switched from the idling state or the single operation state to the cooperative operation state. Cooperation notice portion 277 transmits a cooperation reset notice to the device specified by the device identification information through wireless LAN I/F 208 when the operation state is switched from the cooperative operation state to the single operation state.

First cooperation detection portion 261 sets a shooting state of shooting control portion 251. The shooting state includes a single shooting state and a cooperative shooting state. The single shooting state is a state in a case where remote operation portion 253 is in the idling state. The cooperative shooting state is a state in a case where remote operation portion 253 is in the cooperative operation state.

Specifically, first cooperation detection portion 261 sets the shooting state of shooting control portion 251 to the single shooting state at the point of time when shooting control portion 251 is activated. First cooperation detection portion 261 detects whether remote operation portion 253 is activated at the point of time when shooting control portion 251 is activated. First cooperation detection portion 261 determines whether remote operation portion 253 is activated at the point of time when shooting control portion 251 is activated. First cooperation detection portion 261 outputs a second activation notice to remote operation portion 253 if it is determined that remote operation portion 253 is activated.

As described above, second cooperation detection portion 271 of remote operation portion 253 may switch the operation state from the single operation state to the cooperative operation state if a second activation notice is input from first cooperation detection portion 261. In such a case, second cooperation detection portion 271 outputs cooperation destination device information to first cooperation detection portion 261. The cooperation destination device information includes the device identification information of the device serving as a target for remote operation, among MFPs 100, 101, 102, here, MFP 100. When the cooperation destination device information is input from second cooperation detection portion 271, first cooperation detection portion 261 switches the shooting state from the single shooting state to the cooperative shooting state and outputs a transmission command to transmission portion 263. The transmission command includes the device identification information included in the cooperation destination device information input from second cooperation detection portion 271.

If it is detected that remote operation portion 253 is in the remote operation state (cooperative operation state) when the shooting state is switched in the single shooting state, first cooperation detection portion 261 switches the shooting state from the single shooting state to the cooperative shooting state. As described above, if shooting control portion 251 is activated at the point of time when a permission signal is received from any one of MFPs 100, 101, 102, second cooperation detection portion 271 of remote operation portion 253 outputs a first activation notice to shooting control portion 251 to give a notice that remote operation portion 253 is in the remote operation state (cooperative operation state). The first activation notice includes the device identification information of the device serving as a target for remote operation, among MFPs 100, 101, 102, here, MFP 100. When a first activation notice is input from second cooperation detection portion 271, first cooperation detection portion 261 detects that remote operation portion 253 is in the remote operation state. When a first activation notice is input from second cooperation detection portion 271, first cooperation detection portion 261 switches the shooting state from the single shooting state to the cooperative shooting state and outputs a transmission command to transmission portion 263. The transmission command includes the device identification information included in the first activation notice input from second cooperation detection portion 271.

Furthermore, when shooting control portion 251 terminates, in other words, when CPU 201 terminates execution of the shooting control program, first cooperation detection portion 261 outputs a reset notice to first cooperation detection portion 271 of shooting control portion 251, if in the cooperative shooting state.

Conversely, when remote operation portion 253 terminates, or when the operation state is switched from the cooperative operation state to the single operation state, second cooperation detection portion 271 of remote operation portion 253 outputs a reset notice to first cooperation detection portion 261. Therefore, when a reset notice is input from second cooperation detection portion 271, first cooperation detection portion 261 switches the shooting state from the cooperative shooting state to the single shooting state.

Shooting screen display portion 267 displays a shooting operation screen on display unit 206 if the shooting state is set in the single shooting state. Shooting screen display portion 267 outputs a shooting operation screen to remote operation portion 253 if the shooting state is set in the cooperative shooting state. The shooting operation screen is an operation screen for accepting user's operation input to allow camera 202 to shoot an image of a subject and includes a shutter button for instructing camera 202 to shoot an image.

Remote operation screen display portion 279 displays a remote operation screen on display unit 206 if the operation state is set in the single operation state. Remote operation screen display portion 279 outputs a remote operation screen to cooperation screen display portion 281 if the operation state is set in the cooperative operation state. The remote operation screen is an operation screen for accepting remote operation input by the user to allow the device serving as a target for remote operation, here, MFP 100 to execute a process. The remote operation screen may be included in the remote operation program or may be received from MFP 100 serving as a target for remote operation.

When the operation state is set in the cooperative operation state, cooperation screen display portion 281 receives the shooting operation screen from shooting screen display portion 267 and receives the remote operation screen from remote operation screen display portion 279. Cooperation screen display portion 281 generates a cooperation screen in which the shooting operation screen and the remote operation screen are arranged side by side and displays the cooperation screen on display unit 206.

Figure 7:
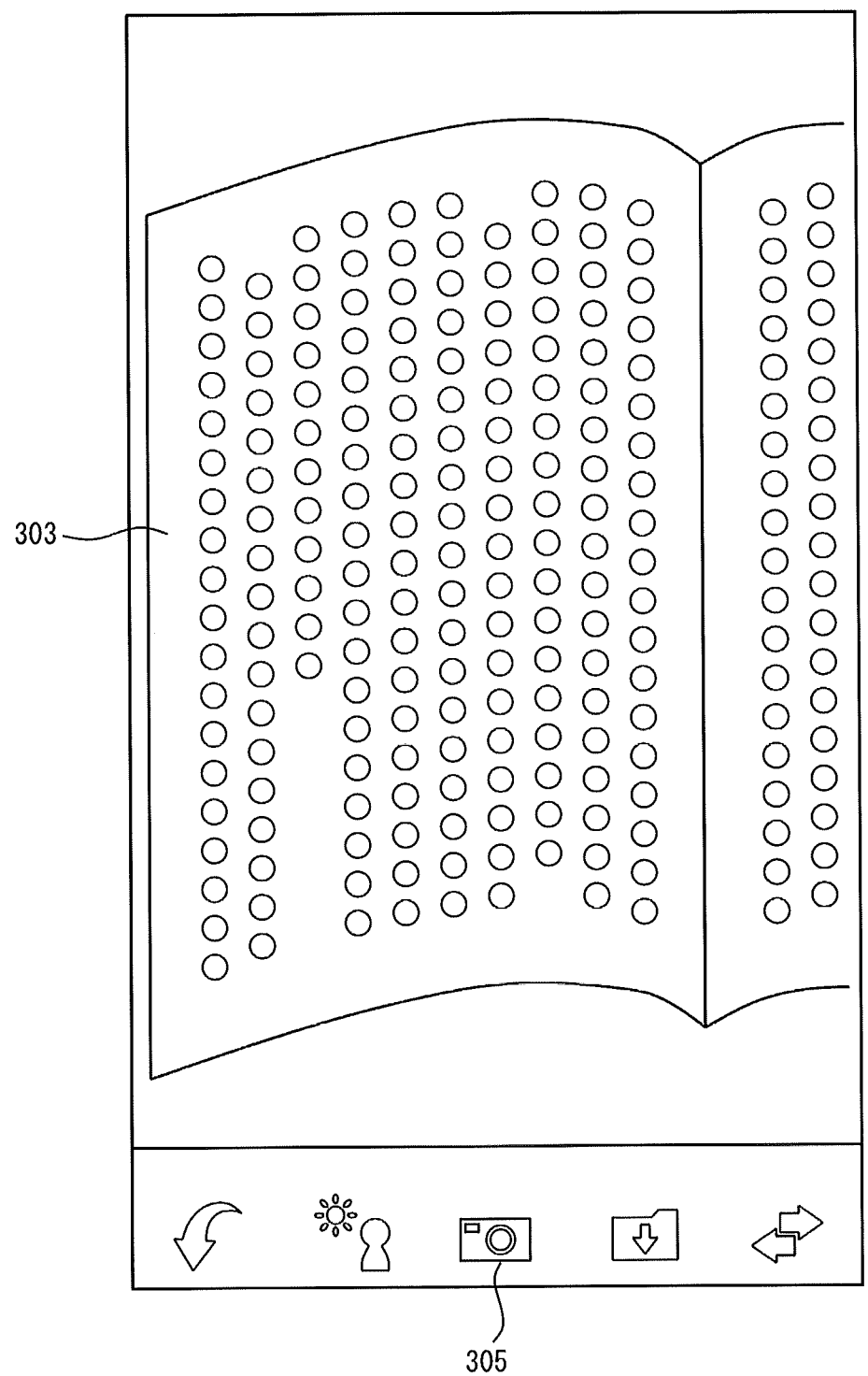
FIG. 7 shows an example of a shooting operation screen.

FIG. 7 shows an example of the shooting operation screen. Referring to FIG. 7, shooting operation screen 301 includes an area 303 for displaying an image of image data output by camera 202 shooting an image of a subject, and a shutter button 305. Here, an image of an open book is included in area 303. In this case, a subject of camera 202 is the open book.

Figure 8:
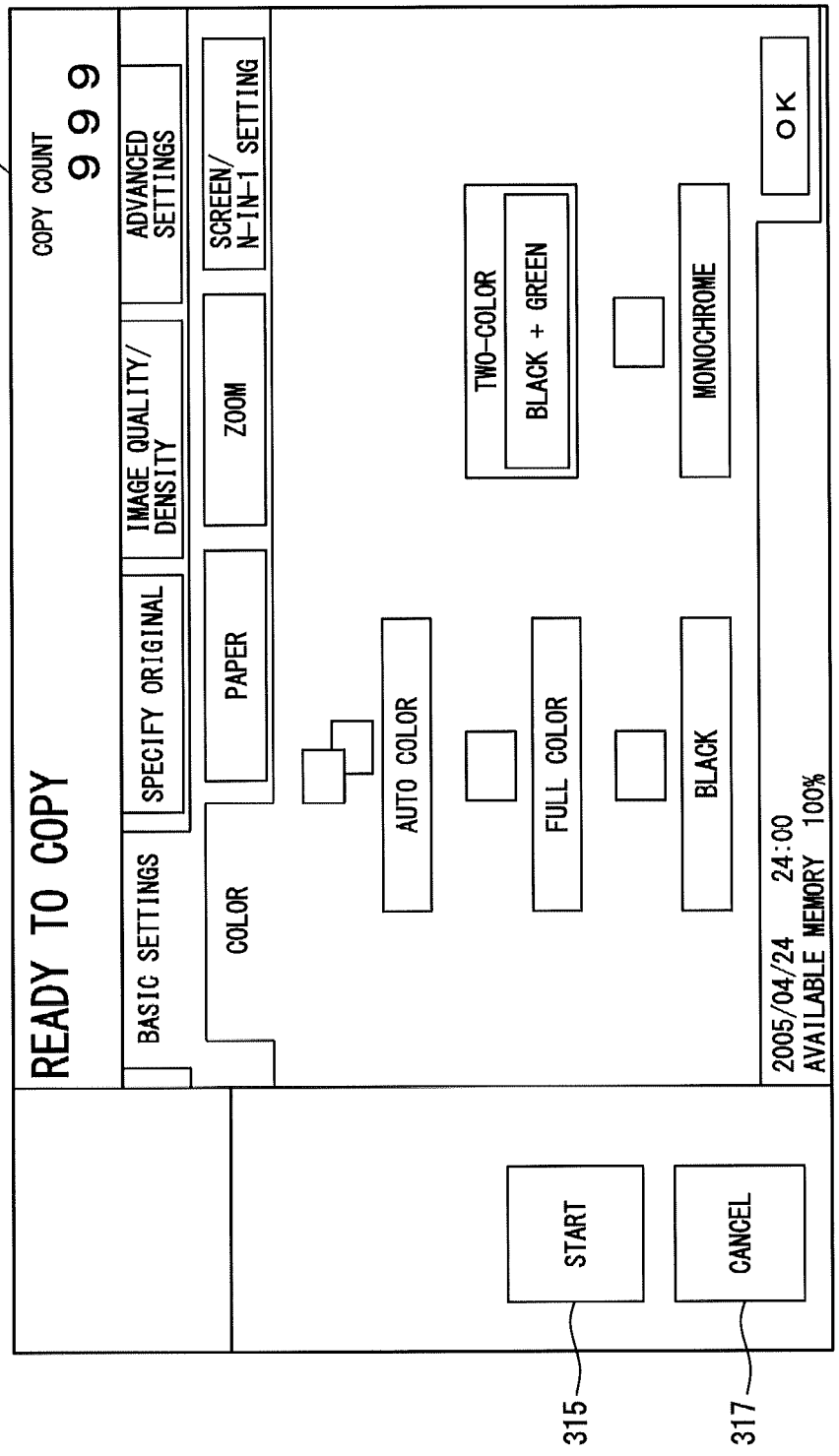
FIG. 8 shows an example of a remote operation screen.

FIG. 8 shows an example of the remote operation screen. Referring to FIG. 8, a remote operation screen 311 includes an area 313 for displaying a screen corresponding to the operation screen appearing on display unit 161 of MFP 100 serving as a target for remote operation, a start button 315 for giving an instruction for execution, and a cancel button 317 for cancelling execution of a process.

Figure 9:
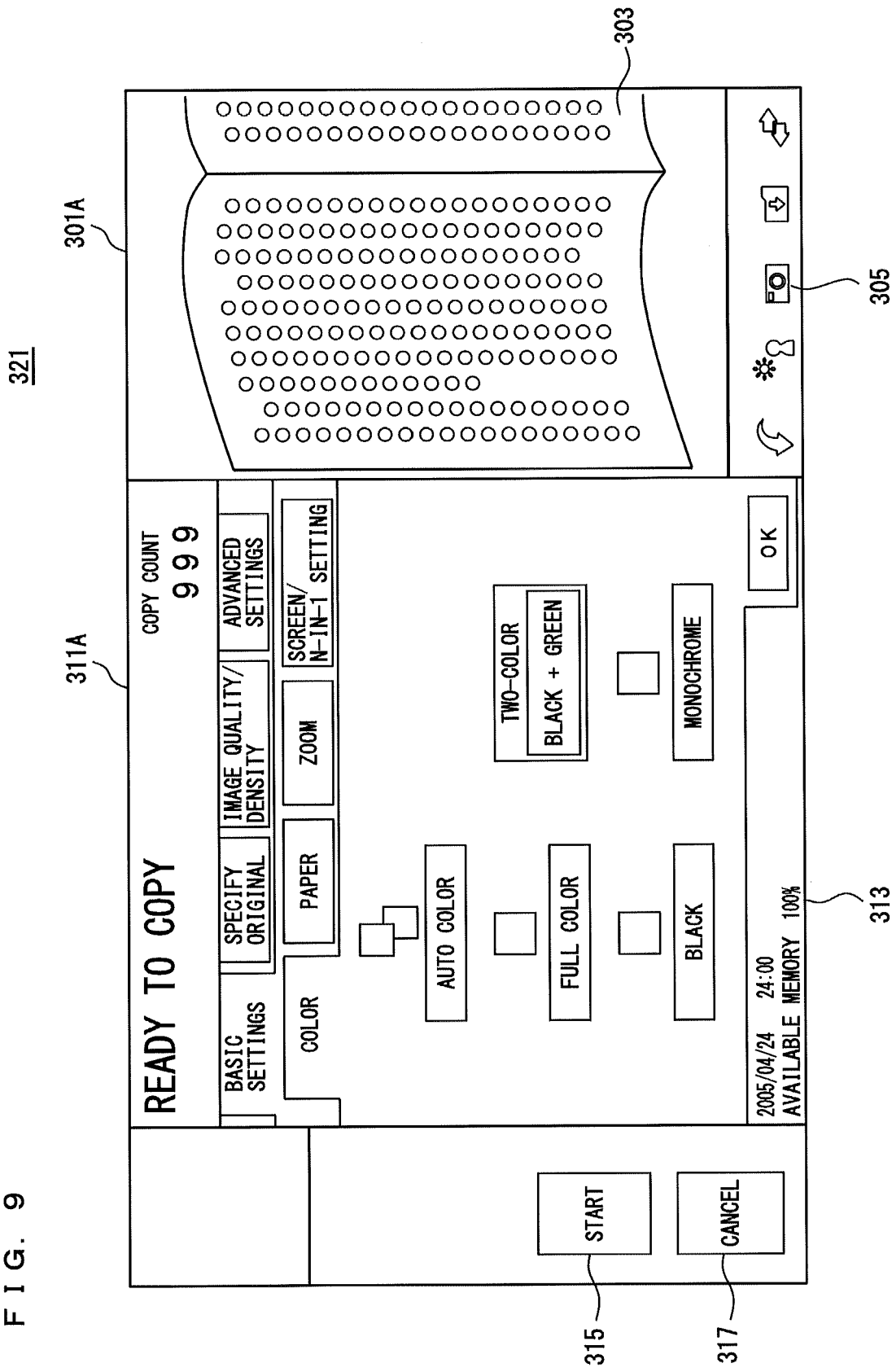
FIG. 9 shows an cooperation screen.

FIG. 9 shows an example of the cooperation screen. Referring to FIG. 9, a cooperation screen 321 includes an area 301A in which shooting operation screen 301 shown in FIG. 7 is arranged and an area 311A in which remote operation screen 311 shown in FIG. 8 is arranged. Area 301A includes shutter button 305. Area 311A includes start button 315.

Returning to FIG. 6, remote operation accepting portion 275 receives the device identification information of a device serving as a target for remote operation, here, MFP 100 from second cooperation detection portion 271. When the operation state is set in the single operation state, remote operation accepting portion 275 accepts remote operation input by the user through operation unit 207 in accordance with the remote operation screen appearing on display unit 206 and transmits a remote operation command corresponding to the accepted remote operation to MFP 100 that is a device serving as a target for remote operation, through wireless LAN I/F 208. Specifically, the user designates a position in the remote operation screen, so that remote operation allocated to the position designated by the user in the remote operation screen is specified.

When the operation state is set in the cooperative operation state, remote operation accepting portion 275 accepts operation input by the user through operation unit 207 in accordance with the cooperation screen appearing on display unit 206. If the user designates an area in the remote operation screen included in the cooperation screen, remote operation accepting portion 275 specifies the position designated by the user in the remote operation screen.

If the position designated by the user in the remote operation screen is in an area other than the area allocated for remote operation to give an instruction to execute a process, remote operation accepting portion 275 specifies the remote operation allocated to the position designated by the user in the remote operation screen and transmits a remote operation command corresponding to the specified remote operation to MFP 100 that is a device serving as a target for remote operation, through wireless LAN I/F 208. The remote operation to give an instruction to execute a process includes remote operation to instruct MFP 100 to execute an image forming process, remote operation to give an instruction to execute a document scanning process, remote operation to give an instruction to execute a data transmission process, and remote operation to give an instruction to execute a data storage process. The area allocated for remote operation to give an instruction to execute a process is, for example, an area representing a button to instruct MFP 100 to start a process. More specifically, in the case where cooperation screen 321 shown in FIG. 9 is displayed, the area including start button 315 is designated. In the case where the remote operation screen includes graphics depicting the operation panel of MFP 100, the area representing the start button included in hard key unit 167 is designated.

If the position designated by the user in the remote operation screen is in an area allocated for remote operation to give an instruction to execute a process, remote operation accepting portion 275 outputs a signal indicating that an execution instruction is designated, to shooting command output portion 273 without transmitting a remote operation command.

When the operation state is set in the cooperative operation state, if the signal indicating that an execution instruction is designated is input from remote operation accepting portion 275, shooting command output portion 273 outputs a shooting command to shooting control portion 251.

Shooting instruction accepting portion 265 accepts a shooting instruction input by the user. When the shooting state is set in the single shooting state, if the user designates shutter button 305 of shooting operation screen 301 appearing on display unit 206, operation unit 207 detects the position of shutter button 305 in the shooting operation screen. Shooting instruction accepting portion 265 accepts a shooting instruction when operation unit 207 detects the position of shutter button 305. When the shooting state is set in the single shooting state, shooting instruction accepting portion 265 controls camera 202 to shoot an image of a subject in response to acceptance of the shooting instruction and stores image data output by camera 202 into flash memory 203.

When the shooting state is set in the cooperative shooting state, if the user designates shutter button 305 in shooting operation screen 301A included in cooperation screen 321 appearing on display unit 206, operation unit 207 detects the position of the shutter button in shooting operation screen 301A. When the shooting state is set in the cooperative shooting state, if a shooting command is input from shooting command output portion 273, shooting instruction accepting portion 265 accepts a shooting instruction. In response to acceptance of the shooting instruction, shooting instruction accepting portion 265 controls camera 202 to shoot an image of a subject and outputs a transmission command to transmission portion 263. When the shooting state is set in the cooperative shooting state, the image data output by camera 202 may be stored into flash memory 203 or may not be stored.

When the shooting state is set in the cooperative shooting state, shooting instruction accepting portion 265 may analyze a through image output by camera 202 and detect an event such as turning pages of a book. If such an event is detected, a shooting instruction may be accepted. Accordingly, the user only has to make a motion of turning pages of a book and can perform remote operation easily without the need for inputting operation of designating shutter button 305 or start button 315.

When the shooting state is set in the cooperative shooting state, transmission portion 263 receives the device identification information of the device serving as a target for remote operation from first cooperation detection portion 261 and receives a transmission command from shooting instruction accepting portion 265. When a transmission command is input, transmission portion 263 transmits image data output by camera 202 to the device specified by the device identification information input from first cooperation detection portion 261 through wireless I/F 208.

Figure 10:
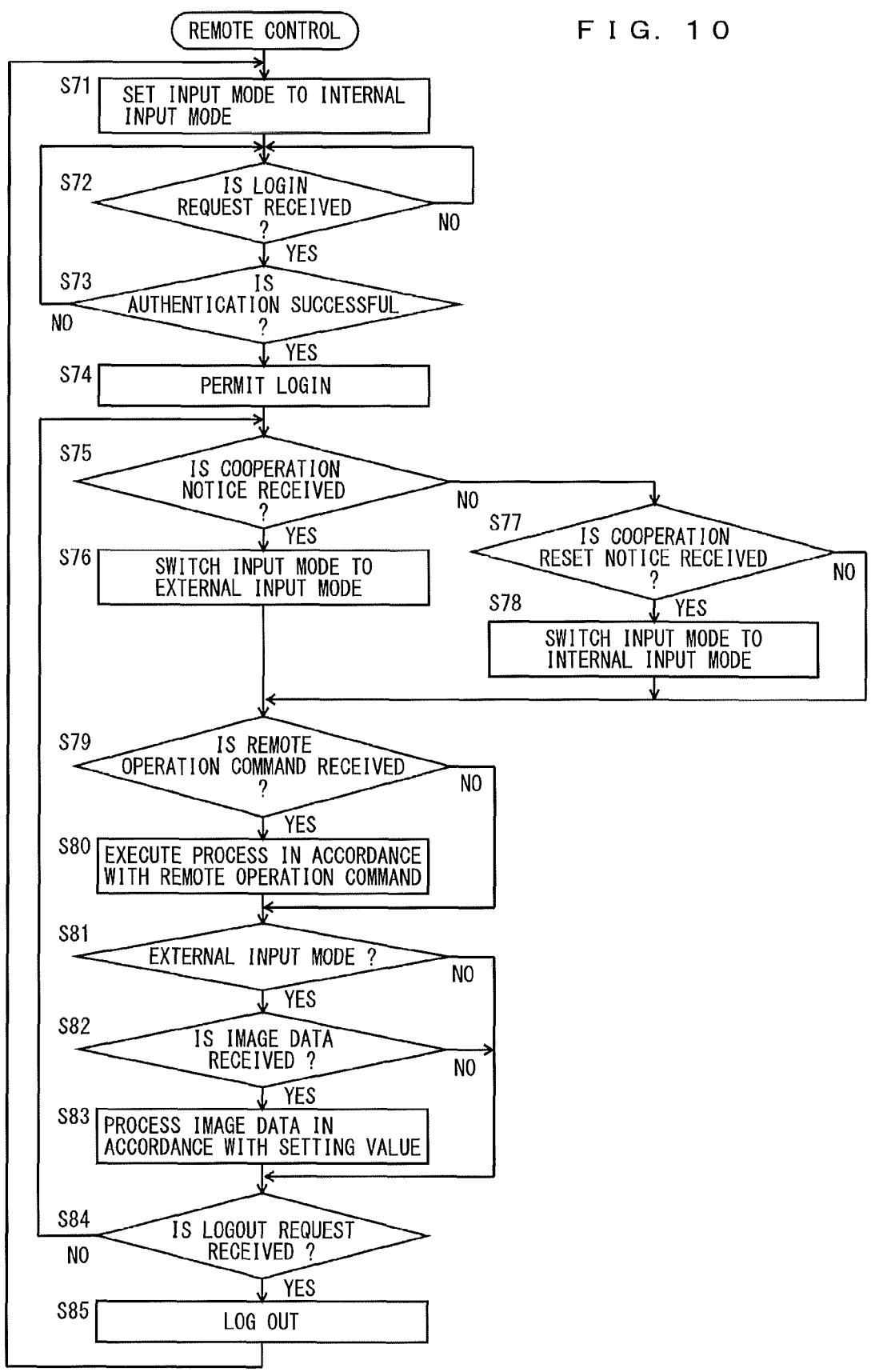
FIG. 10 is a flowchart showing an exemplary flow of a remote control process.

FIG. 10 is a flowchart showing an exemplary flow of a remote control process. The remote control process is executed by CPU 111 by CPU 111 of MFP 100 executing the remote control program stored in ROM 113, HDD 115, or CD-ROM 118.

Referring to FIG. 10, CPU 111 sets the input mode to the internal input mode (step S71). It is then determined whether a login request is received (step S72). The process waits until communication I/F unit 112 establishes connection with portable information device 200 and receives a login request from portable information device 200 (NO in step S72). If a login request is received (YES in step S72), the process proceeds to step S73.

In step S73, it is determined whether authentication is successful. If authentication is successful, the process proceeds to step S74. If authentication is failed, the process returns to step S72. Specifically, a login screen is transmitted to portable information device 200 through communication I/F unit 112, and user identification information and authentication information transmitted by portable information device 200 are received. The received user identification information and authentication information is compared with the user data stored beforehand in HDD 115. If they agree, it is determined that authentication is successful. If they do not agree, it is determined that authentication is failed. In step S74, login of the user of portable information device 200 is permitted. The process then proceeds to step S75.

In step S75, it is determined whether a cooperation notice is received. It is determined whether communication I/F unit 112 receives a cooperation notice from portable information device 200. If a cooperation notice is received, the process proceeds to step S76. If not, the process proceeds to step S77. In step S76, the input mode is switched to the external input mode. The process then proceeds to step S79. In step S77, it is determined whether a cooperation reset notice is received. It is determined whether communication I/F unit 112 receives a cooperation reset notice from portable information device 200. If a cooperation reset notice is received, the process proceeds to step S78. If not, the process proceeds to step S79. In step S78, the input mode is switched to the internal input mode. The process then proceeds to step S79.

In step S79, it is determined whether a remote operation command is received. It is determined whether communication I/F unit 112 receives a remote operation command from portable information device 200. If a remote operation command is received, the process proceeds to step S80. If not, the process proceeds to step S81. In step S80, a process is executed in accordance with the received remote operation command. The process then proceeds to step S81. If a remote operation command to set a setting value is received, the setting value included in the remote operation command is set. Specifically, the setting value is stored into RAM 114. If a remote operation command to give an instruction to execute an image forming process is received, image forming unit 140 and paper feed unit 150 are controlled so that an image forming process is executed in accordance with the setting value. If a remote operation command to give an instruction to execute a document scanning process is received, automatic document feeder 120 and document scanning unit 130 are controlled so that a document scanning process is executed in accordance with the setting value. If a remote operation command to give an instruction to execute a data transmission process is received, communication I/F unit 112 and facsimile unit 116 are controlled so that a data transmission process is executed in accordance with the setting value. If a remote operation command to give an instruction to execute a data storage process is received, HDD 115 or external storage device 117 are controlled so that a data storage process is executed in accordance with the setting value.

In step S81, it is determined whether the input mode is set in the external input mode. If the external input mode is set, the process proceeds to step S82. If not, the process proceeds to step S84. In step S82, it is determined whether image data is received. If communication I/F unit 112 receives image data from portable information device 200, the process proceeds to step S83. If not, the process proceeds to step S84. In step S83, the received image data is processed in accordance with the setting value. The process executed here is an image forming process, and image forming unit 140 forms an image of the received image data. The process executed in step S83 is not limited to an image forming process but may be a process corresponding to the setting value set in step S80 in accordance with the remote operation command received as a result of execution of step S79 immediately before execution of step S80. If a setting value for an image forming process is set, an image forming process is executed. If a setting value for a document scanning process is set, a document scanning process is executed. If a setting value for a data transmission process is set, a data transmission process is executed. If a setting value for a data storage process is set, a data storage process is executed.

In step S84, it is determined whether a logout request is received. If a logout request is received, the process proceeds to step S85. If not, the process returns to step S75. In step S85, the user permitted to log in in step S74 is logged out. The process then returns to step S71.

Figure 11:
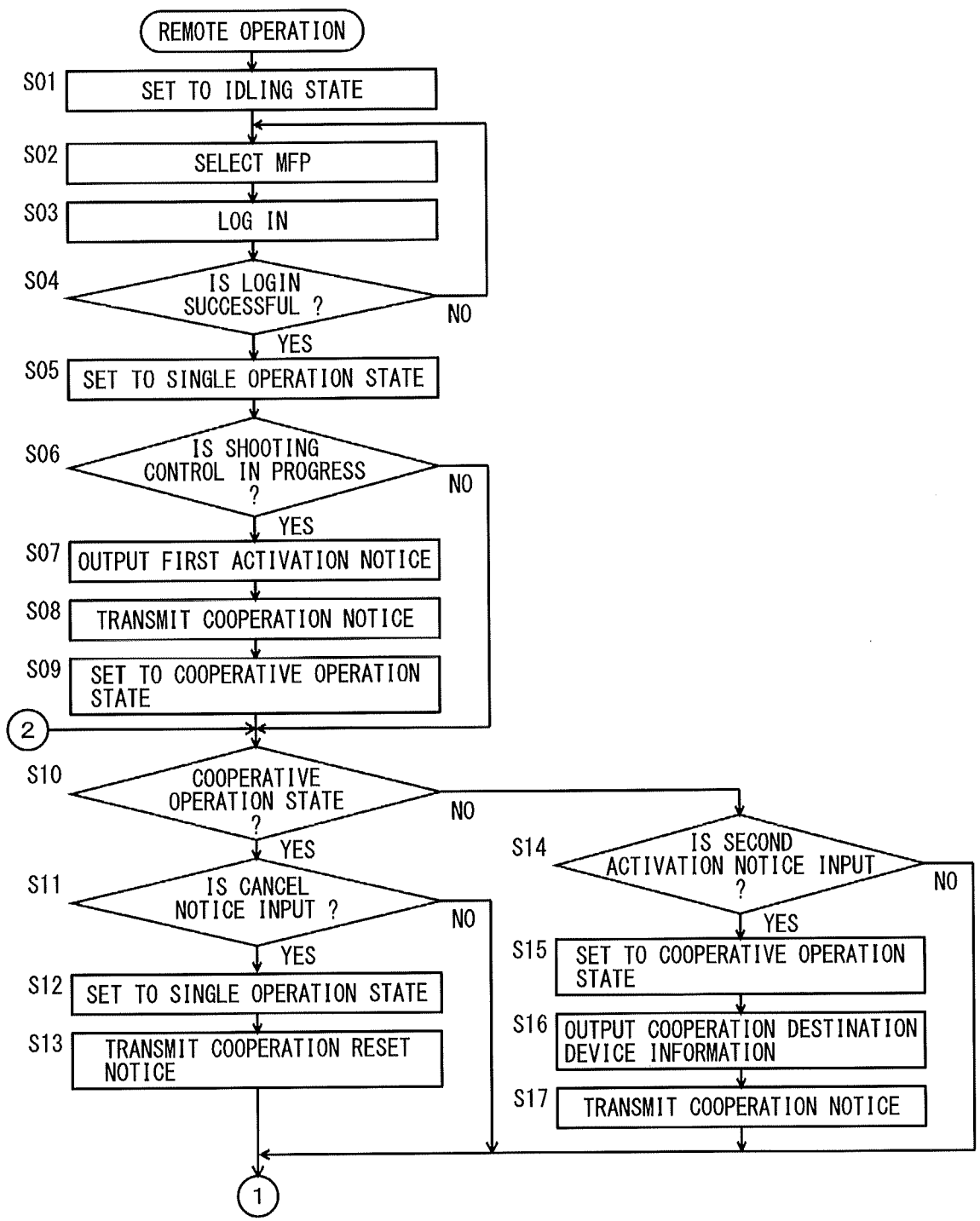
FIG. 11 is a first flowchart showing an exemplary flow of a remote operation process.

FIG. 11 and FIG. 12 are flowcharts showing an exemplary flow of a remote operation process. The remote operation process is executed by CPU 201 by CPU 201 of portable information device 200 executing the remote operation program stored in flash memory 203. Referring to FIG. 11 and FIG. 12, CPU 201 sets the operation state to the idling state (step S01).

In the next step S02, one of MFPs 100, 101, 102 is selected. A select screen is displayed on display unit 206 for displaying a selection of the respective device identification information of MFPs 100, 101, 102 registered beforehand as devices that can be a target for remote operation. If the user inputs operation of selecting device identification information displayed on the select screen to operation unit 207, the device having the selected device identification information is selected from among MFPs 100, 101, 102. In the following, it is assumed that MFP 100 is selected by the user as a device serving as a target for remote operation.

In the next step S03, the selected device is logged in. A login request is transmitted to MFP 100, and a login screen returned from MFP 100 is displayed on display unit 206. Then, user identification information and authentication information input by the user to operation unit 207 in accordance with the login screen are transmitted to MFP 100. It is then determined whether login is successful (step S04). If login is successful, the process proceeds to step S05. If not, the process returns to step S02. In step S05, the operation state is set to the single operation state. The process then proceeds to step S06.

In step S06, it is determined whether shooting control is in progress. If the shooting control program is being executed, it is determined that shooting control is in progress. If shooting control is in progress, the process proceeds to step S07. If not, the process proceeds to step S10. In step S07, a first activation notice is output to a task (shooting control portion 251) that executes the shooting control program. The process then proceeds to step S08. The first activation notice includes the device identification information of the device serving as a target for remote operation to which login is permitted in step S04, here, MFP 100. A cooperation notice is then transmitted to the device (MFP 100) serving as a target for remote operation (step S08). This is to switch the input mode of the device (MFP 100) serving as a target for remote operation to the external input mode. The operation state is then set to the cooperative operation state (step S09). The process then proceeds to step S10.

In step S10, the process branches depending on the operation state. If the operation state is the cooperative operation state, the process proceeds to step S11. If the operation state is the single operation state, the process proceeds to step S14. In step S11, it is determined whether a reset notice is input from the task (shooting control portion 251) that executes the shooting control program. If a reset notice is input, the process proceeds to step S12. If not, the process proceeds to step S18. In step S12, the operation state is set to the single operation state. The process then proceeds to step S13. In step S13, a cooperation reset notice is transmitted to the device (MFP 100) serving as a target for remote operation through wireless LAN I/F 208. The process then proceeds to step S18. This is to switch the input mode of the device (MFP 100) serving as a target for remote operation to the internal input mode.

On the other hand, in step S14, it is determined whether a second activation notice is input from the task (shooting control portion 251) that executes the shooting control program. The second activation notice is a signal output at the point of time when the task that executes the shooting control program is activated. If a second activation notice is input, the process proceeds to step S15. If not, the process proceeds to step S18. In step S15, the operation state is set to the cooperative operation state. The process then proceeds to step S16. In step S16, cooperation destination device information is output to the task (shooting control portion 251) that executes the shooting control program. The cooperation destination device information includes the device identification information of the device serving as a target for remote operation to which login is successful in step S04, here, MFP 100. In the next step S17, a cooperation notice is transmitted to the device (MFP 100) serving as a target for remote operation. The process then proceeds to step S18. This is to switch the input mode of the device (MFP 100) serving as a target for remote operation to the external input mode.

In step S18, the process branches depending on the operation state. If the operation state is the cooperative operation state, the process proceeds to step S19. If the operation state is the single operation state, the process proceeds to step S22. In step S22, a remote operation screen is displayed on display unit 206. The process then proceeds to step S 23.

When the process proceeds to step S19, CPU 211 is executing the shooting control program. In step S19, therefore, a shooting operation screen is acquired from the task that executes the shooting control program. A cooperation screen is then generated (step S20). The cooperation screen is a screen in which a remote operation screen for remote operation and the shooting operation screen acquired in step S19 are arranged side by side. In the next step S21, the cooperation screen is displayed on display unit 206. The process then proceeds to step S23.

In step S23, it is determined whether operation is accepted. The operation detected by operation unit 207 is accepted. If operation is accepted, the process proceeds to step S24. If not, the process proceeds to step S27. In step S24, the process branches depending on the operation state. If the operation state is the cooperative operation state, the process proceeds to step S25. If the operation state is the single operation state, the process proceeds to step S27. In step S25, it is determined whether the operation is operation of designating start button 315. If the operation is designating start button 315, the process proceeds to step S26. If not, the process proceeds to step S27. In step S26, a shooting command is output to the task that executes the shooting control program. The process then proceeds to step S28. On the other hand, in step S27, a remote operation command corresponding to the operation accepted in step S23 is transmitted to the device serving as a target for remote operation, here, MFP 100. The process then proceeds to step S28.

In step S28, it is determined whether a logout instruction is accepted. If a logout instruction is accepted, the process proceeds to step S29. If not, the process returns to step S10. In step S29, it is determined whether the operation state is the cooperative operation state. If it is the cooperative operation state, the process proceeds to step S30. If not, step S30 is skipped, and the process ends. In step S30, a reset notice is output to the task (shooting control portion 251) that executes the shooting control program. The process then ends.

Figure 13:
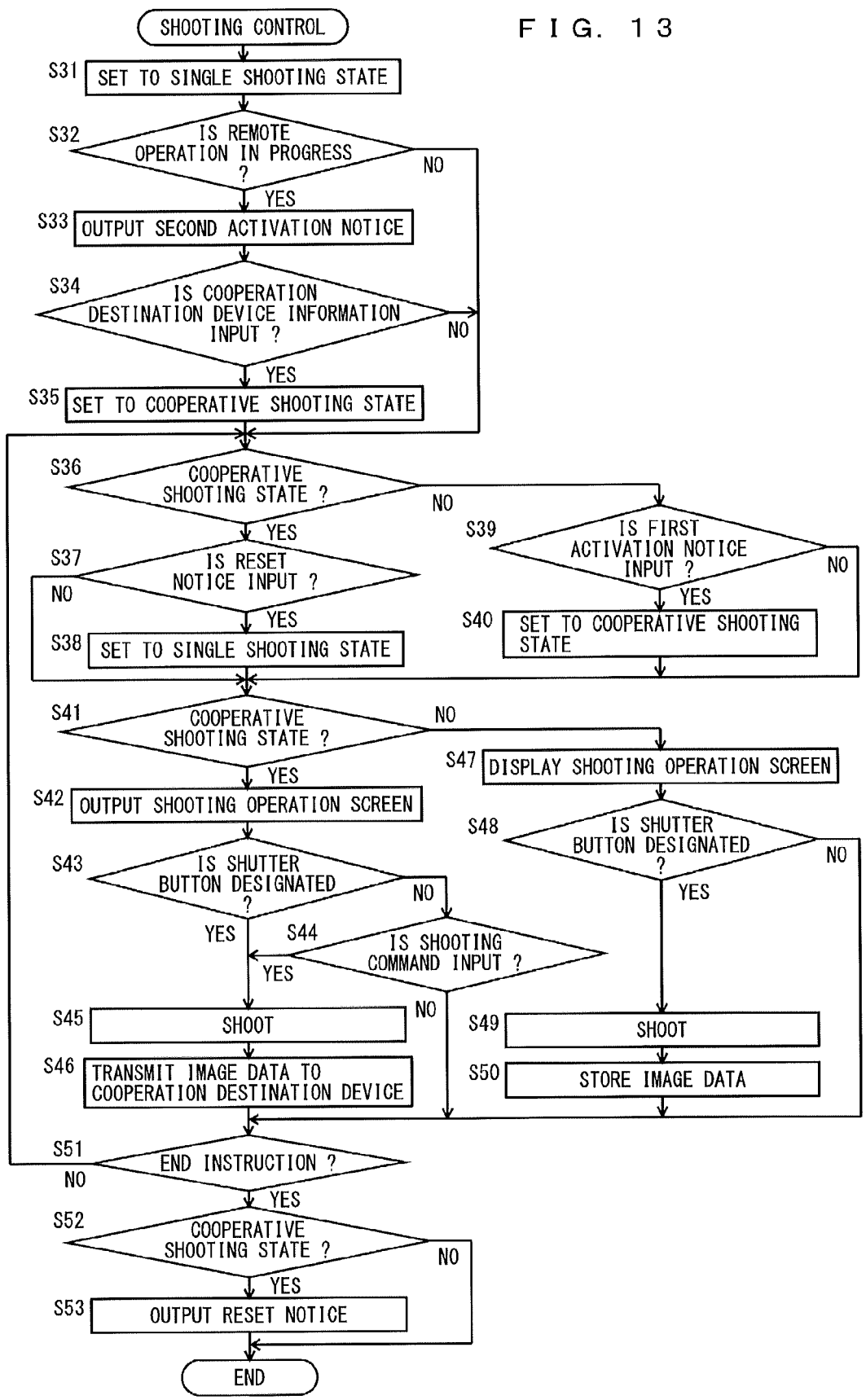
FIG. 13 is a flowchart showing an exemplary flow of a shooting control process.

FIG. 13 is a flowchart showing an exemplary flow of a shooting control process. The shooting control process is a process executed by CPU 201 by CPU 201 of portable information device 200 executing the shooting control program stored in flash memory 203. Referring to FIG. 12, CPU 201 sets the shooting state to the single shooting state (step S31).

In the next step S32, it is determined whether remote operation is in progress. If the remote operation program is being executed, it is determined that remote operation is in progress. If remote operation is in progress, the process proceeds to step S33. If not, the process proceeds to step S36. In step S33, a second activation notice is output to the task (remote operation portion 253) that executes the remote operation program. The process then proceeds to step S34. As shown in FIG. 11 and FIG. 12, when the operation state is set in the single operation state, the task that executes the remote operation program receives the second activation notice (YES in step S14) and then outputs cooperation destination device information (step S16). When the operation state is set in the idling state, the task that executes the remote operation program outputs nothing even when the second activation notice is input. In step S34, it is determined whether cooperation destination device information is input from the task that executes the remote operation program. If cooperation destination device information is input, the process proceeds to step S35. If not, the process proceeds to step S36. In step S35, the shooting state is set to the cooperative shooting state. The process then proceeds to step S36.

In step S36, the process branches depending on the shooting state. If the shooting state is the cooperative shooting state, the process proceeds to step S37. If the shooting state is the single shooting state, the process proceeds to step S39. In step S37, it is determined whether a reset notice is input from the task (remote operation portion 253) that executes the remote operation program. If a reset notice is input, the process proceeds to step S38. If not, step S38 is skipped, and the process proceeds to step S41. In step S38, the shooting state is set to the single shooting state. The process proceeds to step S41.

On the other hand, in step S39, it is determined whether a first activation notice is input from the task (remote operation portion 253) that executes the remote operation program. The first activation notice is a signal output (step S07) at the point of time when the task that executes the remote operation program is activated and the operation state is switched from the idling state to the cooperative operation state (step S09), as shown in FIG. 11 and FIG. 12. The first activation notice includes the device identification information of the device serving as a target for remote operation, here, MFP 100. If a first activation notice is input, the process proceeds to step S40. If not, the process proceeds to step S41. In step S40, the shooting state is set to the cooperative shooting state. The process then proceeds to step S41.

In step S41, the process branches depending on the shooting state. If the shooting state is the cooperative shooting state, the process proceeds to step S42. If the shooting state is the single shooting state, the process proceeds to step S47.

When the process proceeds to step S42, CPU 211 is executing the remote operation program. In step S42, therefore, a shooting operation screen is output to the task that executes the remote operation program. When the shooting operation screen is input, the task that executes the remote operation program displays a cooperation screen including the shooting operation screen on display unit 206. The shooting operation screen therefore appears on display unit 206. In step S43, it is determined whether shutter button 305 included in shooting operation screen 301A is designated. If shutter button 305 is designated, the process proceeds to step S45. If not, the process proceeds to step S44.

In step S44, it is determined whether a shooting command is input from the task that executes the remote operation program. If a shooting command is input, the process proceeds to step S45. If not, the process proceeds to step S51. In step S45, camera 202 shoots an image of a subject. Image data captured and output by camera 202 is then transmitted to the cooperation destination device through wireless LAN I/F 208 (step S46). The process then proceeds to step S51. The cooperation destination device is a device serving as a target for remote operation. The cooperation destination device is specified by the device identification information included in the cooperation destination device information input from the task that executes the remote operation program in step S34 or by the device identification information included in the first activation notice input from the task that executes the remote operation program in step S39.

On the other hand, in step S47, shooting operation screen 301 is displayed on display unit 206. The process then proceeds to step S48. In step S47, it is determined whether shutter button 305 included in shooting operation screen 301 is designated. If shutter button 305 is designated, the process proceeds to step S49. If not, the process proceeds to step S51. In step S49, camera 202 shoots an image of a subject. Image data output and captured by camera 202 is then stored into flash memory 203 (step S50). The process then proceeds to step S51.

In step S51, it is determined whether an end instruction is accepted. An end instruction is accepted if the user inputs predetermined operation for terminating execution of the shooting control program to operation unit 207. The predetermined operation is, for example, operation of designating a predetermined area in the shooting operation screen. If an end instruction is accepted, the process proceeds to step S52. If not, the process ends. In step S53, a reset notice is output to the task (remote operation portion 253) that executes the remote operation program. The process then ends.

<Modification>

In image processing system 1 in the foregoing embodiment, MFP 100 remotely operated by portable information device 200 switches the input mode to the external input mode when portable information device 200 is in the cooperative operation state, portable information device 200 transmits image data captured by camera 202 to MFP 100 in the cooperative operation state, and MFP 100 processes the image data received from portable information device 200 in the external input mode.

Image processing system 1 in the modification is the same in that MFP 100 remotely operated by portable information device 200 switches the input mode to the external mode when portable information device 200 is in the cooperative operation state. In the cooperative operation state, portable information device 200 stores image data captured by camera 202 into flash memory 203 without transmitting to MFP 100 and transmits a remote operation command including a copy start instruction to execute a copy process to MFP 100. In the external input mode, MFP 100 receives the remote operation command from portable information device 200 and then acquires the image data stored in flash memory 203 to form an image of the acquired image data, without allowing document scanning unit 130 to scan a document. In the following, differences between image processing system 1 in the modification and the image processing system as described above will be mainly described.

Figure 14:
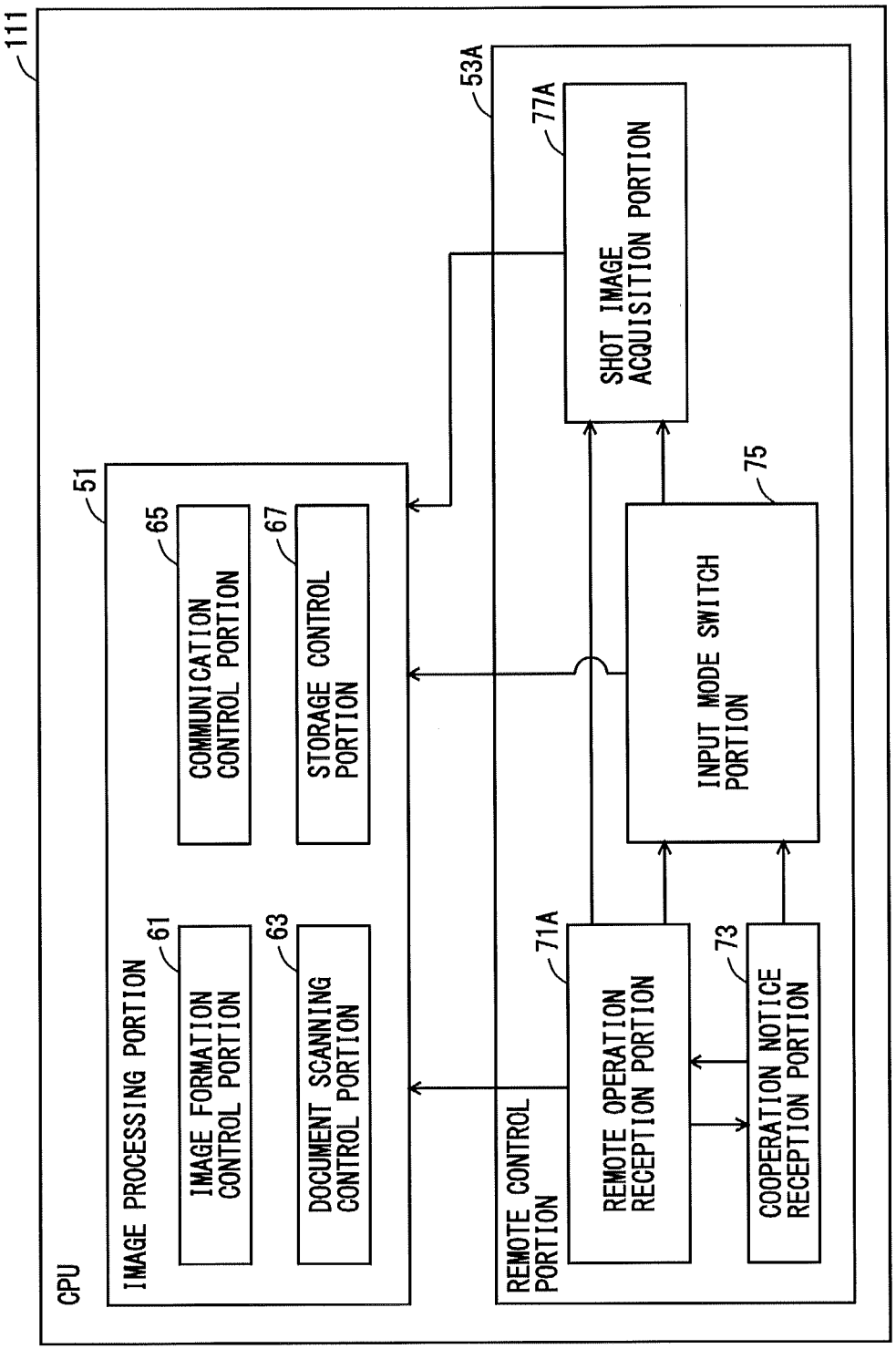
FIG. 14 is a block diagram showing an overview of functions of the CPU of the MFP in a modification.

FIG. 14 is a block diagram showing an overview of functions of the CPU of the MFP in a modification. Referring to FIG. 14, the functions are different from those in FIG. 5 in that remote control portion 53 is changed to a remote control portion 53A. Remote control portion 53A differs from remote control portion 53 shown in FIG. 5 in that remote operation reception portion 71 is changed to a remote operation reception portion 71A and that shot image reception portion 77 is changed to a shot image acquisition portion 77A. The other functions are the same and therefore a description thereof will not be repeated here.

When communication I/F unit 112 establishes connection with portable information device 200 and receives a login request from portable information device 200, remote operation reception portion 71A authenticates the user who operates portable information device 200. If authentication is successful, login is permitted. If authentication is failed, login is not permitted. Remote operation reception portion 71A receives a remote operation command from portable information device 200 until a logout command is received after authentication of the user who operates portable information device 200 is successful. If a remote operation command is received, remote operation reception portion 71A allows image processing portion 51 to execute a process in accordance with the remote operation command.

When the input mode is switched to the external input mode by input mode switch portion 75, if the remote operation command received from portable information device 200 indicates a copy start instruction, remote operation reception portion 71A outputs an acquisition command to shot image acquisition portion 77A. The acquisition command includes the device identification information of portable information device 200 that has transmitted the remote operation command.

When the acquisition command is input, shot image acquisition portion 77A acquires image data from portable information device 200 based on the device identification information included in the acquisition command. The image data is stored in a predetermined area of flash memory 203 of portable information device 200 as will be described later. Shot image acquisition portion 77A transmits an acquisition request to portable information device 200 through communication I/F unit 112 and downloads the image data stored in the predetermined area of flash memory 203. The method in which shot image acquisition portion 77A acquires the image data from portable information device 200 is not limited to this, and any other method may be used. The remote operation command indicating a copy start instruction that is received from portable information device 200 may include the data identification information for identifying image data stored in flash memory 203.

The copy start instruction is a command to allow document scanning unit 130 to scan a document and allows image forming unit 140 to form an image of image data output by document scanning unit 130 scanning a document. When the input mode is switched to the internal input mode by input mode switch portion 75, if a remote operation command indicating a copy start instruction is received from portable information device 200, remote operation reception portion 71A allows document scan control portion 63 to execute a document scanning process and allows image forming control portion 61 to form an image of image data output by document scanning unit 130. When the input mode is switched to the external input mode by input mode switch portion 75, if a remote operation command indicating a copy start instruction is received from portable information device 200, remote operation reception portion 71A allows image forming control portion 61 to form an image of image data acquired by shot image acquisition portion 77A without allowing document scan control portion 63 to execute a document scanning process.

Figure 15:
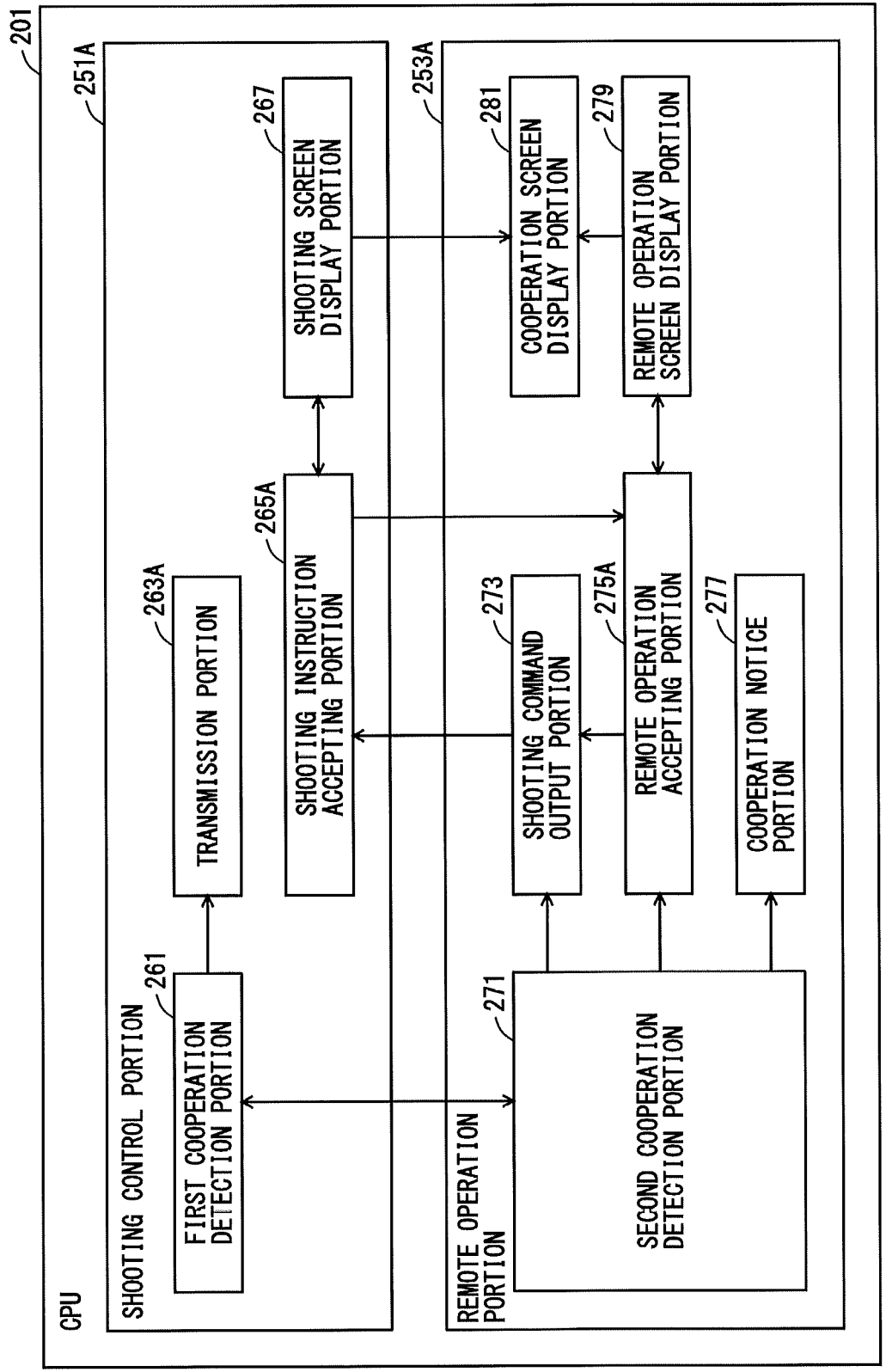
FIG. 15 is a block diagram showing an overview of functions of the CPU of the portable information device in the modification.

FIG. 15 is a block diagram showing an overview of functions of the CPU of the portable information device in the modification. The functions shown in FIG. 15 differ from the functions shown in FIG. 6 in that transmission portion 263 is changed to a transmission portion 263A, shooting instruction accepting portion 265 is changed to a shooting instruction accepting portion 265A, and remote operation accepting portion 275 is changed to a remote operation accepting portion 275A. The other functions are the same as the functions shown in FIG. 6 and therefore a description thereof will not be repeated here.

Remote operation accepting portion 275A receives the device identification information of the device serving as a target for remote operation, here, MFP 100 from second cooperation detection portion 271. When the operation state is set in the single operation state, remote operation accepting portion 275A accepts remote operation input by the user to operation unit 207 in accordance with remote operation screen 311 appearing on display unit 206 and transmits a remote operation command corresponding to the accepted remote operation to MFP 100 that is a device serving as a target for remote operation through wireless LAN I/F 208. Specifically, if the user designates a position in remote operation screen 311, the remote operation allocated to the position designated by the user in remote operation screen 311 is specified.

When the operation state is set in the cooperative operation state, remote operation accepting portion 275A accepts operation input by the user to operation unit 207 in accordance with cooperation screen 321 appearing on display unit 206. If the user designates an area in remote operation screen 311A included in cooperation screen 321, remote operation accepting portion 275 specifies the position designated by the user in remote operation screen 311A.

If the position designated by the user in remote operation screen 311A is in an area other than the area allocated for remote operation to give an instruction to execute a process, remote operation accepting portion 275A specifies the remote operation allocated to the position designated by the user in remote operation screen 311A and transmits a remote operation command corresponding to the specified remote operation to MFP 100 that is a device serving as a target for remote operation, through wireless LAN I/F 208. The area allocated for remote operation to give an instruction to execute a process is, for example, an area representing a button to instruct MFP 100 to start a process. More specifically, the area represents start button 315 in remote operation screen 311A.

If the position designated by the user in the remote operation screen is in an area allocated for remote operation to give an instruction to execute a process, remote operation accepting portion 275A transmits a remote operation command and also outputs a signal indicating that an execution instruction is given to shooting command output portion 273.

When the operation state is set in the cooperative operation state, if the signal indicating that an execution instruction is given is input from remote operation accepting portion 275, shooting command output portion 273 outputs a shooting command to shooting control portion 251.

Shooting instruction accepting portion 265A accepts a shooting instruction input by the user. When the shooting state is set in the single shooting state, if the user designates the shutter button in the shooting operation screen appearing on display unit 206, operation unit 207 detects the position of shutter button 305 in shooting operation screen 301. Shooting instruction accepting portion 265A accepts a shooting instruction if operation unit 207 detects the position of the shutter button. When the shooting state is set in the single shooting state, shooting instruction accepting portion 265A controls camera 202 to shoot an image of a subject in response to acceptance of the shooting instruction and stores image data output by camera 202 into flash memory 203.

When the shooting state is set in the cooperative shooting state, if the user designates shutter button 305 in shooting operation screen 301A included in cooperation screen 321 appearing on display unit 206, shooting instruction accepting portion 265A accepts a shooting instruction in response to operation unit 207 detecting the position of shutter button 305 in shooting operation screen 301A. When the shooting state is set in the cooperative shooting state, if a shooting command is input from shooting command output portion 273, shooting instruction accepting portion 265A accepts the shooting instruction. In response to acceptance of the shooting instruction, shooting instruction accepting portion 265 controls camera 202 to shoot an image of a subject and stores image data output by camera 202 into flash memory 203, and, in addition, outputs a copy start instruction to remote operation accepting portion 275A.

When the shooting state is set in the cooperative shooting state, transmission portion 263A receives the device identification information of the device as a target for remote operation from first cooperation detection portion 261. When the shooting state is set in the cooperative shooting state, wireless LAN I/F 208 may receive an acquisition request from the device as a target for remote operation. In response to reception of the acquisition request, transmission portion 263A transmits image data stored in flash memory 203 to the device that has transmitted the acquisition request through wireless LAN I/F 208.

When the operation state is set in the cooperative operation state, if a copy start instruction is input from shooting instruction accepting portion 265A, remote operation accepting portion 275A transmits a remote operation command indicating a copy start instruction to MFP 100 serving as a target for remote operation, through wireless LAN I/F 208.

Figure 16:
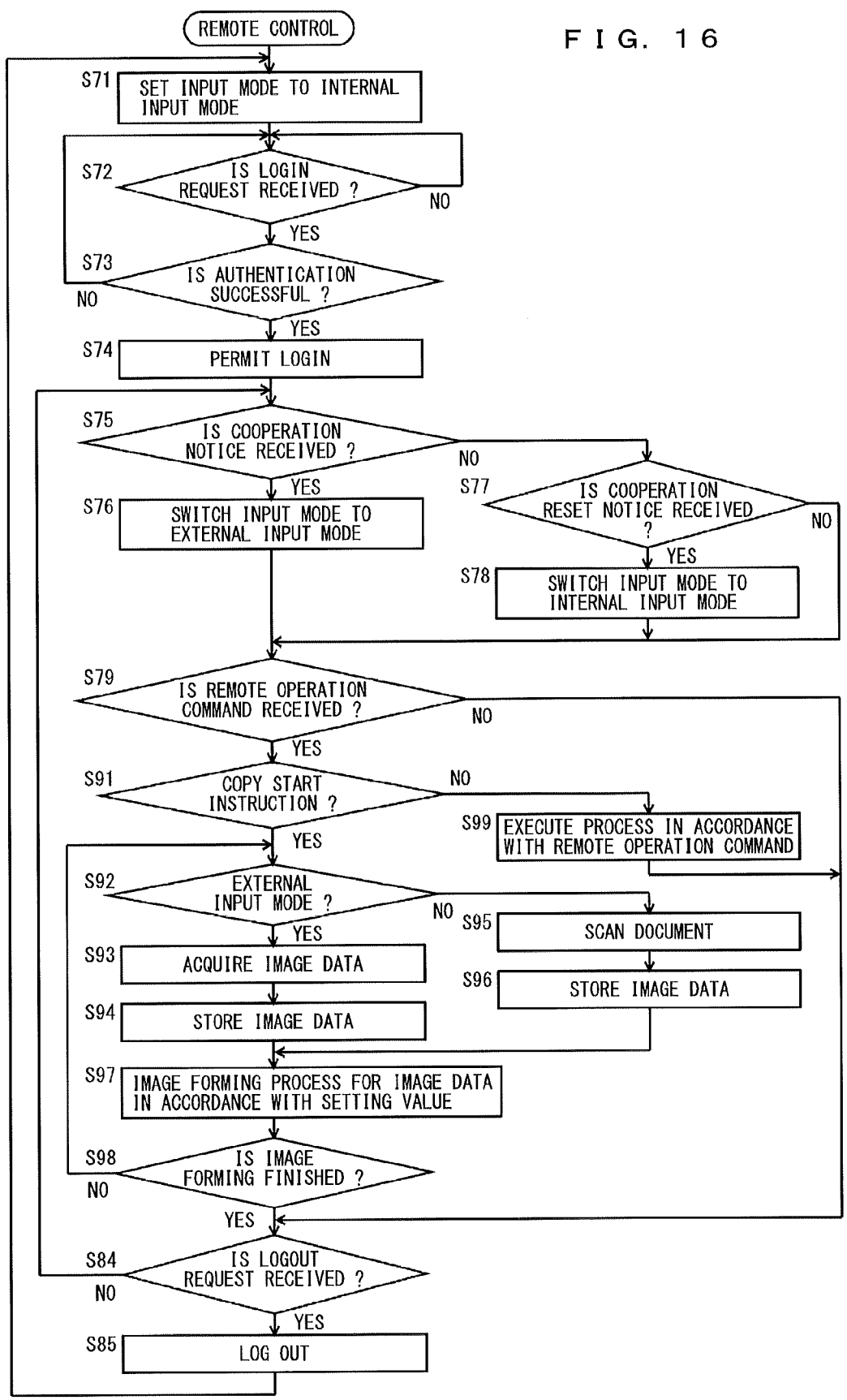
FIG. 16 is a flowchart showing an exemplary flow of a remote control process in the modification.

FIG. 16 is a flowchart showing an exemplary flow of a remote control process in the modification. The remote control process in FIG. 16 differs from the process shown in FIG. 10 in that steps S91 to S99 are executed in place of steps S80 to S83. The other process is the same as the process shown in FIG. 10 and therefore a description thereof will not be repeated here.

In step S79, it is determined whether a remote operation command is received. If a remote operation command is received, the process proceeds to step S91. If not, the process proceeds to step S84.

In step S91, it is determined whether the received remote operation command is a copy start instruction. If it is a copy start instruction, the process proceeds to step S92. If not, the process proceed to step S99. In step S99, a process is executed in accordance with the received remote operation command. The process then proceeds to step S84. If a remote operation command to set a setting value is received, the setting value included in the remote operation command is set. If a remote operation command to give an instruction to execute a data transmission process is received, communication I/F unit 112 or facsimile unit 116 is controlled so that a data transmission process is executed in accordance with the setting value.

In step S92, it is determined whether the input mode is set in the external input mode. If the external input mode is set, the process proceeds to step S93. If not, the process proceeds to step S95. In step S93, image data is acquired from portable information device 200 that has transmitted the remote operation command received in step S79. As described above, when image data obtained by shooting an image of a subject with camera 202 is stored into flash memory 203, portable information device 200 transmits a remote operation command that is a copy command. The image data obtained by shooting an image of a subject that is stored in flash memory 203 of portable information device 200 is thus acquired. The acquired image data is then temporarily stored in RAM 114 (step S94). The process then proceeds to step S97.

On the other hand, in step S95, document scanning unit 130 scans an image of a document. Image data output by document scanning unit 130 scanning a document is temporarily stored into RAM 114 (step S96). The process then proceeds to step S97.

In step S97, image forming unit 140 forms an image of the image data temporarily stored in RAM 114 in step S94 or step S96. It is then determined whether the process of forming an image of image data is finished (step S98). If the image forming process is finished, the process proceeds to step S84. If not, the process returns to step S92. Portable information device 200 may execute shooting multiple times, and a plurality of image data may be acquired from portable information device 200. A document may include a plurality of sheets, and a plurality of image data may be output by document scanning unit 130. In step S98, if a plurality of image data are to be subjected to image formation, it is determined whether image formation is finished for all of them. Accordingly, images of a plurality of pages can be copied through operation of successively shooting images of a plurality of pages such as a book serving as a subject with camera 202.

Figure 17:
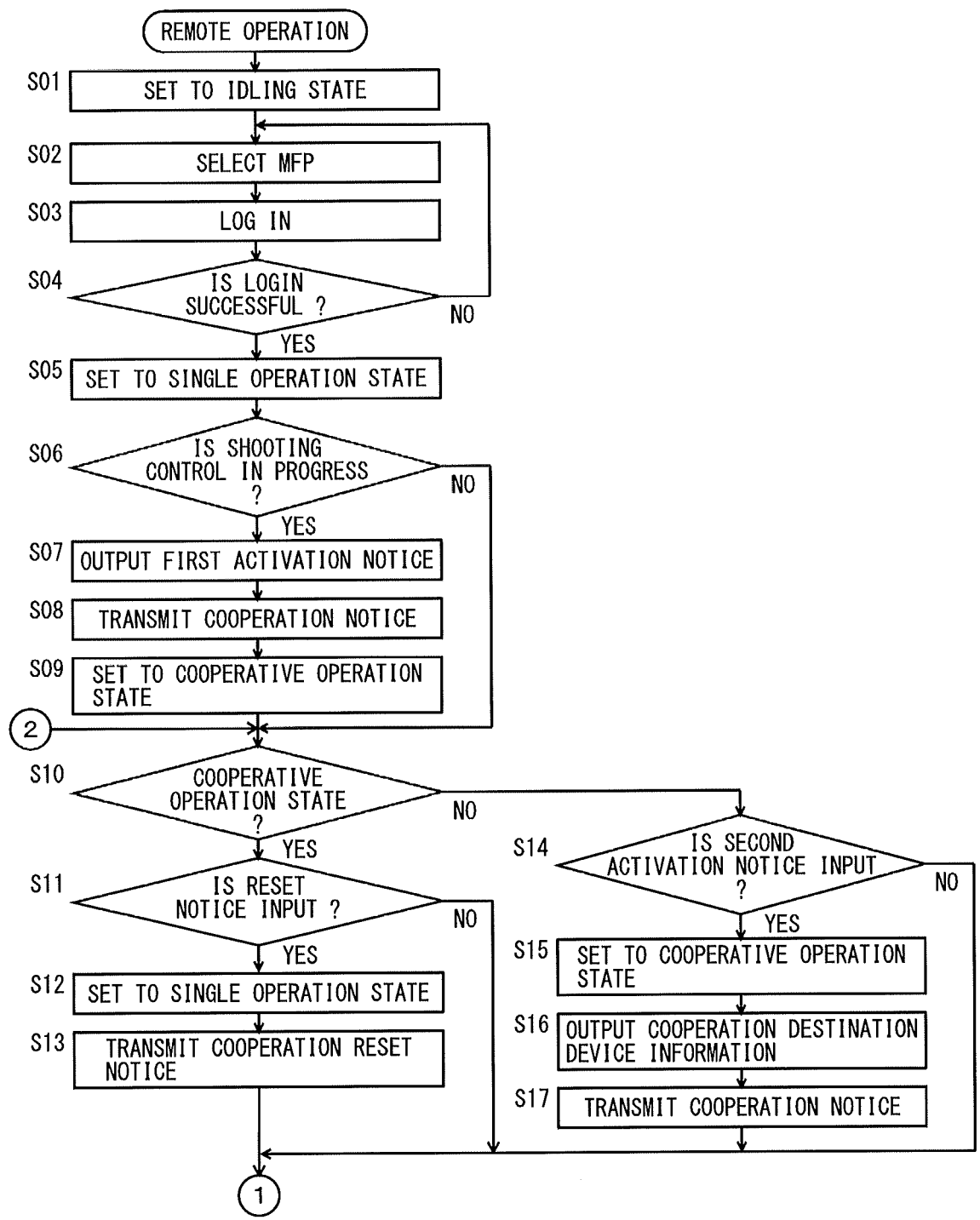
FIG. 17 is a first flowchart showing an exemplary flow of a remote operation process in the modification.
Figure 18:
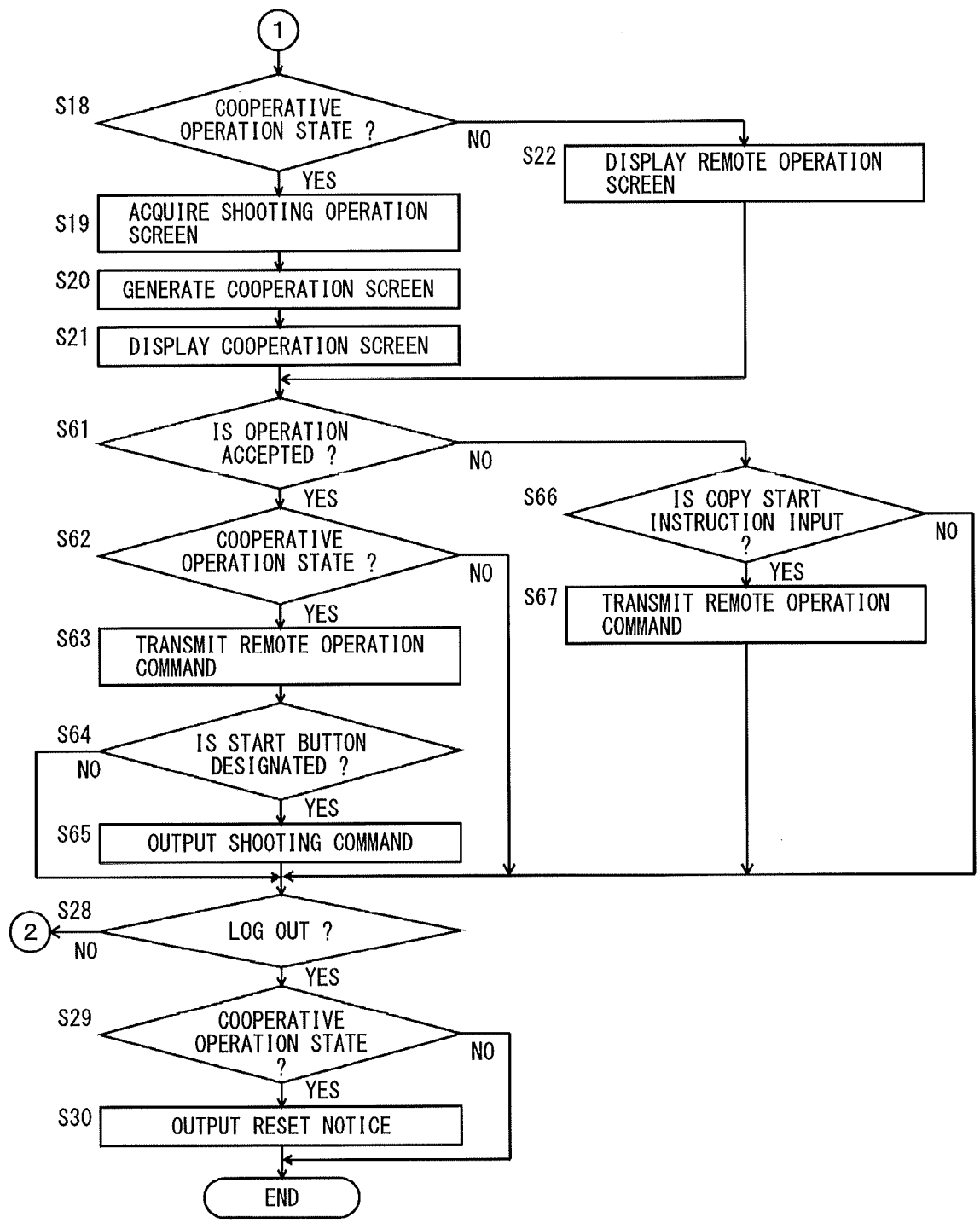
FIG. 18 is a second flowchart showing an exemplary flow of the remote operation process in the modification.

FIG. 17 and FIG. 18 are flowcharts showing an exemplary flow of a remote operation process in the modification. The remote operation process in FIG. 17 and FIG. 18 differ from the remote operation process shown in FIG. 11 and FIG. 12 in that steps S22 to S28 are changed to steps S61 to S67. The other process is the same as the process shown in FIG. 11 and FIG. 12 and therefore a description thereof will not be repeated here.

In step S61, it is determined whether operation is accepted. The operation detected by operation unit 207 is accepted. If operation is accepted, the process proceeds to step S62. If not, the process proceeds to step S66. In step S62, it is determined whether the operation state is the cooperative operation state. If the operation state is the cooperative operation state, the process proceeds to step S63. If the operation state is the single operation state, the process proceeds to step S28. In step S63, a remote operation command corresponding to the operation accepted in step S61 is transmitted to the device serving as a target for remote operation, here, MFP 100. The process then proceeds to step S64.

In step S64, it is determined whether the operation is operation of designating the start button. If the operation is designating start button 315 in remote operation screen 311A included in cooperation screen 321, the process proceeds to step S65. If not, the process proceeds to step S27. In step S65, a shooting command is output to the task (shooting control portion 251A) that executes the shooting control program. The process then proceeds to step S27.

On the other hand, in step S66, it is determined whether a copy start instruction is input from the task (shooting control portion 251A) that executes the shooting control program. If a copy start instruction is input, the process proceeds to step S67. If not, the process proceeds to step S27. In step S67, a remote operation command indicating the copy start instruction input in step S66 is transmitted to the device serving as a target for remote operation, here, MFP 100. The process then proceeds to step S27.

Figure 19:
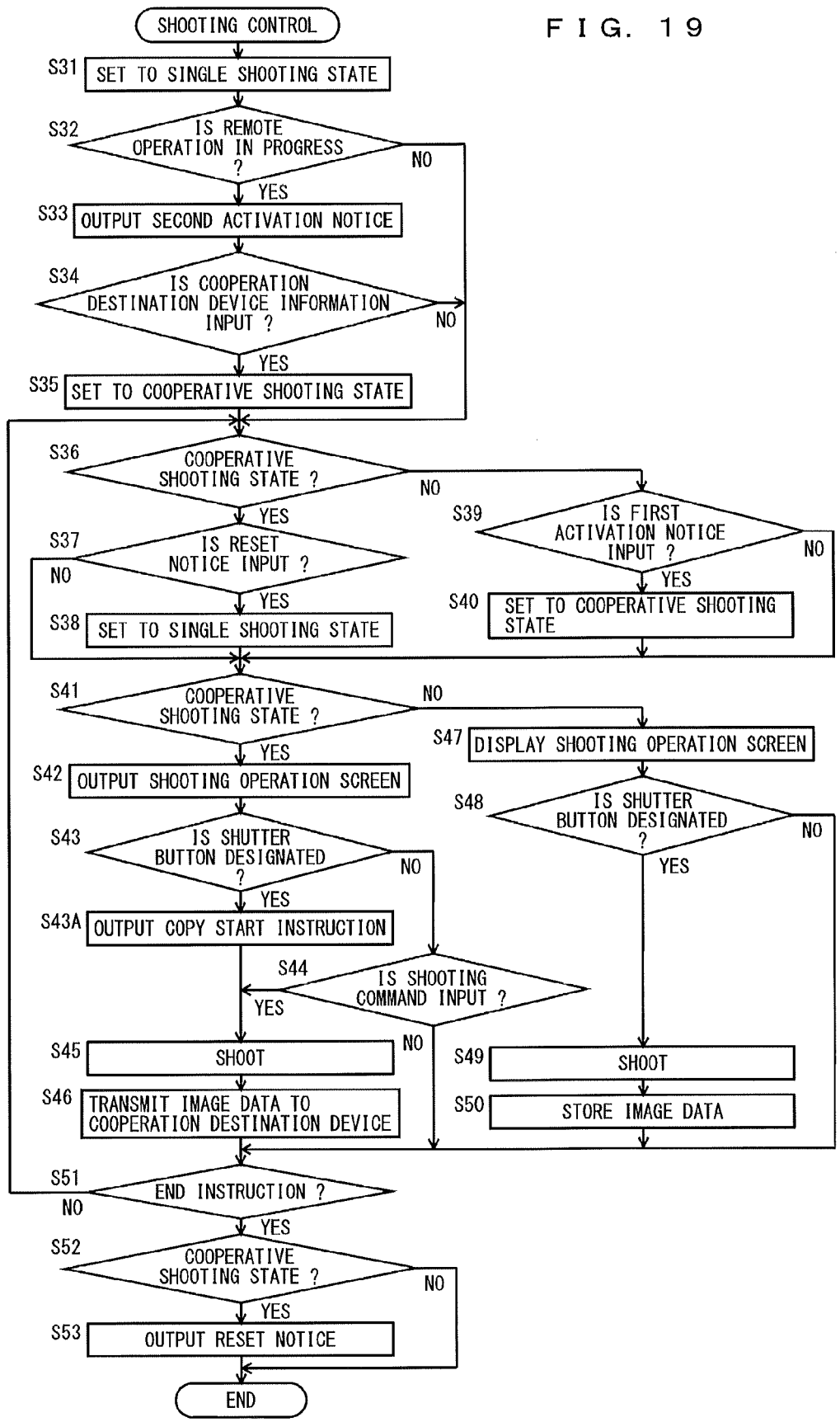
FIG. 19 is a flowchart showing an exemplary flow of a shooting control process in the modification.

FIG. 19 is a flowchart showing an exemplary flow of a shooting control process in the modification. The shooting control process in FIG. 19 differs from the shooting control process shown in FIG. 13 in that step S43A is added between step S43 and step S45. The other process is the same as the process shown in FIG. 13 and therefore a description thereof will not be repeated here.

The process proceeds to step S43A when it is determined that the shutter button included in the shooting operation screen is designated in step S43. In step S43A, a copy start instruction is output to the task (remote operation portion 253A) that executes the remote operation program. The process then proceeds to step S45.

In the modification, a remote operation command transmitted from portable information device 200 to MFP 100 is an execution instruction to execute a copy process, by way of example. However, the remote operation command indicating an execution instruction may be a remote operation command indicating an execution instruction to instruct MFP 100 to execute a document scanning process, a remote operation command indicating an execution instruction to give an instruction to execute a data transmission process, or a remote operation command indicating an execution instruction to give an instruction to execute a data storage process. In this case, in response to a remote operation command indicating an execution instruction being received from portable information device 200, MFP 100 acquires image data stored in flash memory 203 of portable information device 200 and executes a process defined by the remote operation command with the acquired image data as a process target.

As described above, in image processing system 1 in the present embodiment, CPU 201 of portable information device 200 executes the shooting control program to form shooting control portion 251 as a task that controls camera 202, and executes the remote operation program to form remote operation portion 253 as a task that remotely operates any one of MFPs 100, 101, 102. CPU 111 of any one of MFPs 100, 101, 102, for example, MFP 100 executes the remote control program to form remote control portion 53 that controls hardware resources such as document scanning unit 130, image forming unit 140, communication I/F unit 112, and HDD 115 in accordance with a remote operation command received from portable information device 200. If shooting control portion 251 is activated in the remote operation state in which any one of MFPs 100, 101, 102 is remotely controlled, remote operation portion 253 of portable information device 200 gives a notice to one of MFPs 100, 101, 102 that serves as a target for remote operation to indicate the cooperation state of cooperating with shooting control portion 251. Shooting control portion 251 transmits image data output by camera 202 shooting an image of a subject to MFP 100 serving as a target for remote operation during the remote operation state in which remote operation portion 253 remotely operates any one of MFPs 100, 101, 102. On the other hand, after receiving the notice of the cooperation state from portable information device 200, MFP 100 serving as a target for remote operation switches the input mode to the external input mode in which the input source of data to be input to hardware resources is portable information device 200. Therefore, by instructing portable information device 200 to shoot an image, the user can allow MFP 100 serving as a target for remote operation to process image data obtained by shooting an image of a subject with portable information device 200. As a result, the operation of allowing portable information device 200 and any one of MFPs 100, 101, 102 to cooperate with each other for processing becomes easy.

When an execution instruction to allow MFP 100 serving as a target for remote operation to execute a process is accepted, portable information device 200 allows camera 202 to shoot an image of a subject and transmits image data output by camera 202 to MFP 100. Therefore, by inputting remote operation for allowing MFP 100 to execute a process to portable information device 200, the user can allow MFP 100 to process image data obtained by shooting an image of a subject with camera 202.

Specifically, when a copy start instruction to allow MFP 100 serving as a target for remote operation to execute a copy process is accepted, portable information device 200 allows camera 202 to shoot an image of a subject and transmits image data output by camera 202 to MFP 100. On the other hand, when a remote operation command indicating a copy start instruction is received, MFP 100 forms an image of the image data received from portable information device 200. Therefore, by inputting operation for allowing MFP 100 to execute a copy process to portable information device 200, the user can allow MFP 100 to form an image of image data obtained by shooting an image of a subject with camera 202.

While the input mode is switched in the external input mode, if the remote operation command received from portable information device 200 is a copy start instruction, MFP 100 serving as a target for remote operation allows image forming unit 140 to form an image of image data received from portable information device 200 without allowing document scanning unit 130 to scan a document. Therefore, there is no need for modifying a program that controls image forming unit 140.

When shutter button 305 included in shooting operation screen 301A of cooperation screen 321 is designated, portable information device 200 transmits image data obtained by shooting an image of a subject with camera 202 to MFP 100 serving as a target for remote operation. On the other hand, while the input mode is switched to the external input mode, MFP 100 serving as a target for remote operation processes image data in response to the image data being received from portable information device 200. Therefore, by designating shutter button 305, the user can allow MFP 100 serving as a target for remote operation to process image data obtained by shooting an image of a subject with camera 202.

Portable information device 200 displays cooperation screen 321 in which remote operation screen 311 and shooting operation screen 301 are arranged side by side, so that portable information device 200 and MFP 100 serving as a target for remote operation can be operated with one screen.

Portable information device 200 transmits image data output by camera 202 to MFP 100 serving as a target for remote operation in response to an image being shot by camera 202. The user therefore can allow MFP 100 to process image data only by inputting operation of allowing portable information device 200 to shoot an image.

In image processing system 1 in a modification, portable information device 200 temporarily stores image data output by camera 202 into flash memory 203 in response to an image being shot by camera 202 and transmits a remote operation command indicating a copy start instruction to allow MFP 100 serving as a target for remote operation to execute a copy process. MFP 100 receiving the remote operation command indicating a copy start instruction acquires the image data stored in flash memory 203 of portable information device 200 to form an image of the image data. The user therefore can allow MFP 100 to form an image of image data only by inputting operation of allowing portable information device 200 to shoot an image.

Although image processing system 1 has been described in the foregoing embodiments, it is needless to say that the present invention can be specified as a cooperation method that allows MFP 100, 101, 102 to perform the remote control process shown in FIG. 10 or FIG. 16 and allows a portable information device to perform the remote operation process shown in FIG. 11 and FIG. 12 or FIG. 17 and FIG. 18 and a shooting control process shown in FIG. 13 or FIG. 19, or as a remote control program that allows CPU 111 of each of MFPs 100, 101, 102 to perform the remote control process and a cooperation program that allow CPU 201 of portable information device 200 to perform the cooperation method.

Although the present invention has been described and illustrated in detail, it is clearly understood that the same is by way of illustration and example only and is not to be taken by way of limitation, the spirit and scope of the present invention being limited only by the terms of the appended claims.

<Remarks>

(1) The remote operation method according to claim 17, wherein the remote operation step includes a shooting command output step of outputting a shooting command to instruct the shooting means to shoot an image if an execution instruction to allow the image processing means to execute a process is accepted after the notice indicating the cooperation state is given to the image processing device, and the shooting control step includes a step of allowing the shooting means to shoot an image of a subject in response to the shooting command being output.

(2) The remote operation method according to (1), wherein the image processing device further includes document scanning means for scanning a document and outputting image data, and image forming means for forming an image of image data, and the execution instruction includes a copy start instruction to allow the image processing device to execute a copy process of allowing the image forming means to form an image of image data output by the document scanning portion scanning a document.

(3) The remote operation method according to (2), wherein the remote control step includes:

a step of allowing the document scanning means to scan a document and allowing the image forming means to form an image of image data output by the document scanning means scanning a document, if a remote operation command received from the portable information device is the copy start instruction, while the input mode is switched in an internal input mode that is not the external input mode; and a step of allowing the image forming means to form an image of image data received from the portable information device without allowing the document scanning means to scan a document, if a remote operation command received from the portable information device is the copy start instruction, while the input mode is switched in the external input mode.

(4) The remote operation method according to claim 17, wherein the shooting control step includes a shooting instruction accepting step of accepting a shooting instruction input by a user, and a step of allowing the shooting means to shoot an image of a subject in response to the shooting instruction being accepted.

(5) The remote operation method according to (4), wherein the remote control step includes a step of, in response to image data being received from the portable information device, allowing the image processing means to process the received image data while the input mode is switched in the external input mode.

(6) The remote operation method according to any one of claim 17 and (1) to (5), wherein the shooting control step includes a shooting operation screen display step of displaying a shooting operation screen for a user to operate the shooting means, and the remote operation step includes a remote operation screen display step of displaying a remote operation screen for remotely operating the image processing device and a cooperative operation screen display step of displaying the remote operation screen and the shooting operation screen arranged side by side, after the notice indicating the cooperation state is given to the image processing device.

(7) The remote operation method according to any one of claim 17 and (1) to (6), wherein the transmission step includes a step of, in response to the shooting means shooting an image of a subject and outputting image data, transmitting the image data to the image processing device.

(8) The remote operation method according to any one of claim 17 and (1) to (7), wherein the shooting control step includes a step of storing image data output by the shooting means shooting an image of a subject into storage means, the remote operation step includes a step of transmitting a remote operation command indicating an execution instruction to allow the image processing device to execute a process in response to an image of a subject being shot by the shooting means in the cooperation state, the remote control step includes a shot image acquisition step of acquiring the image data stored in the storage means of the portable information device when the remote operation command indicating an execution instruction is received after the notice indicating the cooperation state is given, and the transmission step includes a step of transmitting the image data stored in the storage means to the image processing device in response to a request from the image processing device while the image processing device is being remotely controlled in the remote operation step.

(9) The remote operation method according to claim 18, wherein the remote operation step includes a shooting command output step of outputting a shooting command to instruct the shooting means to shoot an image, if an execution instruction to allow the image processing means to execute a process is accepted after the notice indicating the cooperation state is given to the image processing device, and the shooting control step includes a step of allowing the shooting means to shoot an image of a subject in response to the shooting command being output.

(10) The remote operation method according to claim 9), wherein the image processing device includes document scanning means for scanning a document and outputting image data and image forming means for forming an image of image data, and the execution instruction includes a copy start instruction to allow the image processing device to execute a copy process of allowing the image forming means to form an image of image data output by the document scanning means scanning a document.

(11) The remote operation method according to claim 18, wherein the shooting control step includes a shooting instruction accepting step of accepting a shooting instruction input by a user and a step of allowing the shooting means to shoot an image of a subject in response to the shooting instruction being accepted.

(12) The remote operation method according to any one of claim 18 and (9) to (11), wherein the shooting control step includes a shooting operation screen display step of displaying a shooting operation screen for a user to operate the shooting means, and the remote operation step includes a remote operation screen display step of displaying a remote operation screen for remotely operating the image processing device and a cooperative operation screen display step of displaying the remote operation screen and the shooting operation screen arranged side by side, after the notice indicating the cooperation state is given to the image processing device.

(13) The remote operation method according to any one of claim 18 and (9) to (12), wherein the transmission step includes a step of, in response to the shooting means shooting an image of a subject and outputting image data, transmitting the image data to the image processing device.

(14) The remote operation method according to any one of claim 18 and (1) to (12), wherein the shooting control step includes a step of storing image data output by the shooting means shooting an image of a subject into storage means, the remote operation step includes a step of transmitting a remote operation command indicating an execution instruction to allow the image processing device to execute a process in response to an image of a subject being shot by the shooting means, and the transmission step includes a step of transmitting the image data stored in the storage means to the image processing device in response to a request from the image processing device while the image processing device is being remotely controlled in the remote operation step.

What is claimed is:

1. An image processing system comprising a portable information device and an image processing device,
   the portable information device including
   a shooting portion to shoot an image of a subject,
   a shooting control portion to control the shooting portion while the shooting control portion is in a shooting state, and
   a remote operation portion to remotely operate the image processing device,
   the image processing device including
   an image processing portion to process image data and
   a remote control portion to control the image processing portion in accordance with a remote operation command received from the portable information device,
   the remote operation portion including a cooperation notice portion to give a notice to the image processing device to indicate a cooperation state of cooperating with the shooting control portion,
   the shooting control portion including a transmission portion to transmit image data output by the shooting portion shooting an image of a subject to the image processing device while the shooting control portion is in the shooting state and while the remote operation portion is remotely controlling the image processing device,
   the remote control portion including an input mode switch portion to switch an input mode to an external input mode in which the portable information device is set as an input source of data to be input to the image processing portion, after the notice indicating the cooperation state is given.

2. The image processing system according to claim 1, wherein
   the remote operation portion includes a shooting command output portion to output a shooting command to the shooting control portion if an execution instruction to allow the image processing device to execute a process is accepted in the cooperation state, and
   the shooting control portion allows the shooting portion to shoot an image of a subject in response to the shooting command being input.

3. The image processing system according to claim 2, wherein
   the image processing device further includes
   a document scanning portion to scan a document and output image data and
   an image forming portion to form an image of image data, and
   the execution instruction includes a copy start instruction to allow the image processing device to execute a copy process of allowing the image forming portion to form an image of image data output by the document scanning portion scanning a document.

4. The image processing system according to claim 3, wherein
   while the input mode is switched in an internal input mode that is not the external input mode, if a remote operation command received from the portable information device is the copy start instruction, the remote control portion allows the document scanning portion to scan a document and allows the image forming portion to form an image of image data output by the document scanning portion scanning a document, and while the input mode is switched in the external input mode, if a remote operation command received from the portable information device is the copy start instruction, the remote control portion allows the image forming portion to form an image of image data received from the portable information device without allowing the document scanning portion to scan a document.

5. The image processing system according to claim 1, wherein the shooting control portion includes a shooting instruction accepting portion to accept a shooting instruction input by a user and allows the shooting portion to shoot an image of a subject in response to the shooting instruction being accepted.

6. The image processing system according to claim 5, wherein while the input mode is switched in the external input mode, in response to image data being received from the portable information device, the remote control portion allows the image processing portion to process the received image data.

7. An image processing system comprising a portable information device and an image processing device,
   the portable information device including
   a shooting portion to shoot an image of a subject,
   a shooting control portion to control the shooting portion, and
   a remote operation portion to remotely operate the image processing device,
   the image processing device including
   an image processing portion to process image data and
   a remote control portion to control the image processing portion in accordance with a remote operation command received from the portable information device,
   the remote operation portion including a cooperation notice portion to give a notice to the image processing device to indicate a cooperation state of cooperating with the shooting control portion,
   the shooting control portion including a transmission portion to transmit image data output by the shooting portion shooting an image of a subject to the image processing device while the remote operation portion is remotely controlling the image processing device,
   the remote control portion including an input mode switch portion to switch an input mode to an external input mode in which the portable information device is set as an input source of data to be input to the image processing portion, after the notice indicating the cooperation state is given, wherein
   the shooting control portion includes a shooting operation screen display portion to display a shooting operation screen for a user to operate the shooting portion, and
   the remote operation portion includes
   a remote operation screen display portion to display a remote operation screen for remotely operating the image processing device and
   a cooperative operation screen display portion to display the remote operation screen and the shooting operation screen arranged side by side.

8. The image processing system according to claim 1, wherein in response to the shooting portion shooting an image of a subject and outputting image data, the transmission portion transmits the image data to the image processing device.

9. The image processing system according to claim 1, wherein
the shooting control portion stores image data output by the shooting portion shooting an image of a subject into a storage portion,
the remote operation portion transmits a remote operation command indicating an execution instruction to allow the image processing device to execute a process in response to an image of a subject being shot by the shooting portion in the cooperation state,
the remote control portion includes a shot image acquisition portion to acquire the image data stored in the storage portion of the portable information device when the remote operation command indicating an execution instruction is received after the notice indicating the cooperation state is given, and
the transmission portion transmits the image data stored in the storage portion to the image processing device in response to an acquisition request being received from the image processing device while the remote operation portion is remotely controlling the image processing device.

10. A portable information device capable of remotely operating an image processing device, comprising:
a shooting portion to shoot an image of a subject;
a shooting control portion to control the shooting portion while the shooting control portion is in a shooting state; and
a remote operation portion to remotely operate the image processing device,
the remote operation portion including a cooperation notice portion to give a notice to the image processing device to indicate a cooperate state of cooperating with the shooting control portion in order to switch an input source of data to be processed by the image processing device to the portable information device,
the shooting control portion including a transmission portion to transmit image data output by the shooting portion shooting an image of a subject to the image processing device in order to allow the image processing device to process the image data while the shooting control portion is in the shooting state and while the remote operation portion is remotely controlling the image processing device.

11. The portable information device according to claim 10, wherein
the remote operation portion includes a shooting command output portion to output a shooting command to the shooting control portion if an execution instruction to allow the image processing device to execute a process is accepted in the cooperation state, and
the shooting control portion allows the shooting portion to shoot an image of a subject in response to the shooting command being input.

12. The portable information device according to claim 11, wherein
the image processing device including
a document scanning portion to scan a document and output image data and
an image forming portion to form an image of image data, and
the execution instruction includes a copy start instruction to allow the image processing device to execute a copy process of allowing the image forming portion to form an image of image data output by the document scanning portion scanning a document.

13. The portable information device according to claim 10, wherein the shooting control portion includes a shooting instruction accepting portion to accept a shooting instruction input by a user and allows the shooting portion to shoot an image of a subject in response to the shooting instruction being accepted.

14. The portable information device according to claim 10, wherein
the shooting control portion includes a shooting operation screen display portion to display a shooting operation screen for a user to operate the shooting portion, and
the remote operation portion includes
a remote operation screen display portion to display a remote operation screen for remotely operating the image processing device and
a cooperative operation screen display portion to display the remote operation screen and the shooting operation screen arranged side by side.

15. The portable information device according to claim 10, wherein in response to the shooting portion shooting an image of a subject and outputting image data, the transmission portion transmits the image data to the image processing device.

16. The portable information device according to claim 10, wherein
the shooting control portion stores image data output by the shooting portion shooting an image of a subject into a storage portion,
the remote operation portion transmits a remote operation command indicating an execution instruction to allow the image processing device to execute a process in response to an image of a subject being shot by the shooting portion in the cooperation state, and
the transmission portion transmits the image data stored in the storage portion to the image processing device in response to a request from the image processing device while the remote operation portion is remotely controlling the image processing device.

17. A remote operation method performed in an image processing system including a portable information device and an image processing device,
the portable information device including a shooting portion to shoot an image of a subject,
the image processing device including an image processing portion to process image data,
the method comprising:
allowing the portable information device to perform
a shooting control step of controlling the shooting portion while in a shooting state and
a remote operation step of remotely operating the image processing device; and
allowing the image processing device to perform
a remote control step of controlling the image processing portion in accordance with a remote operation command received from the portable information device,
the remote operation step including
a step of detecting a shooting ready state in which shooting by the shooting portion is ready in the shooting control step and
a cooperation notice step of giving a notice to the image processing device to indicate a cooperation state while the shooting ready state is being detected,
the shooting control step including
a step of detecting a remote operation state in which the image processing device is being remotely operated in the remote operation step and a transmission step of transmitting image data output by the shooting portion shooting an image of a subject to the image processing device while in the shooting state and while the remote operation state is being detected, the remote control step including an input mode switch step of switching an input mode to an external input mode in which the portable information device is set as an input source of data to be input to the image processing portion, after the notice indicating the cooperation state is given.

18. A remote operation method performed in a portable information device capable of remotely operating an image processing device, the portable information device including a shooting portion to shoot an image of a subject, the method comprising:

a shooting control step of controlling the shooting portion while in a shooting state; and a remote operation step of remotely operating the image processing device, the remote operation step including a step of detecting a shooting ready state in which shooting by the shooting portion is ready in the shooting control step and a cooperation notice step of giving a notice to the image processing device to indicate a cooperation state in order to switch an input source of data to be processed by the image processing device to the portable information device while the shooting ready state is being detected, the shooting control step including a step of detecting a remote operation state in which the image processing device is being remotely operated in the remote operation step and a transmission step of transmitting image data output by the shooting portion shooting an image of a subject to the image processing device in order to allow the image processing device to process the image data while in the shooting state and while the remote operation state is being detected.

19. A non-transitory computer-readable recording medium encoded with a cooperation program executed in a computer that controls a portable information device capable of remotely operating an image processing device, the portable information device including a shooting portion to shoot an image of a subject, the program causing the computer to perform:

a shooting control step of controlling the shooting portion while in a shooting state; and a remote operation step of remotely operating the image processing device, the remote operation step including a step of detecting a shooting ready state in which shooting by the shooting portion is ready in the shooting control step and a cooperation notice step of giving a notice to the image processing device to indicate a cooperation state in order to switch an input source of data to be processed by the image processing device to the portable information device while the shooting ready state is being detected, the shooting control step including a step of detecting a remote operation state in which the image processing device is being remotely operated in the remote operation step and a transmission step of transmitting image data output by the shooting portion shooting an image of a subject to the image processing device in order to allow the image processing device to process the image data while in the shooting state and while the remote operation state is being detected.

* * * * *